(12) United States Patent
Wang

(10) Patent No.: US 9,387,829 B2
(45) Date of Patent: Jul. 12, 2016

(54) WINDSHIELD WIPER CONNECTOR

(71) Applicant: XIAMEN FUKE CAR ACCESSORIES CO., LTD., Xiamen (CN)

(72) Inventor: Shuwu Wang, Xiamen (CN)

(73) Assignee: XIAMEN FUKE CAR ACCESSORIES CO., LTD., Xiamen, Fujian (CN)

( * ) Notice: Subject to any disclaimer, the term of this patent is extended or adjusted under 35 U.S.C. 154(b) by 308 days.

(21) Appl. No.: 14/106,610

(22) Filed: Dec. 13, 2013

(65) Prior Publication Data

US 2015/0166016 A1 Jun. 18, 2015

(51) Int. Cl.
*B60S 1/40* (2006.01)
*B60S 1/38* (2006.01)

(52) U.S. Cl.
CPC ............. *B60S 1/4003* (2013.01); *B60S 1/387* (2013.01); *B60S 1/3851* (2013.01); *B60S 1/3858* (2013.01); *B60S 1/407* (2013.01); *B60S 1/4074* (2013.01); *B60S 1/4087* (2013.01); *B60S 2001/408* (2013.01); *B60S 2001/409* (2013.01); *B60S 2001/4022* (2013.01); *B60S 2001/4051* (2013.01); *B60S 2001/4054* (2013.01)

(58) Field of Classification Search
CPC ........ B60S 1/40; B60S 1/3849; B60S 1/3851; B60S 1/3853; B60S 1/3858; B60S 1/4009; B60S 1/4006; B60S 2001/4022; B60S 2001/4035; B60S 1/4003; B60S 1/387; B60S 1/407; B60S 1/4074; B60S 1/4087; B60S 2001/4051; B60S 2001/4054; B60S 2001/408; B60S 2001/409

See application file for complete search history.

(56) References Cited

U.S. PATENT DOCUMENTS

| | | | | |
|---|---|---|---|---|
| 3,192,551 | A * | 7/1965 | Appel | B60S 1/38 15/250.43 |
| 8,370,987 | B2 * | 2/2013 | Ritt | 15/250.201 |
| 8,479,350 | B2 * | 7/2013 | Kim | B60S 1/3858 15/250.32 |
| 9,221,429 | B2 * | 12/2015 | Avasiloaie | B60S 1/3851 |
| 2007/0017054 | A1 * | 1/2007 | Hussaini | B60S 1/4003 15/250.32 |
| 2008/0148509 | A1 * | 6/2008 | Bacarella | B60S 1/3806 15/250.32 |
| 2010/0257688 | A1 * | 10/2010 | Huang | B60S 1/3858 15/250.32 |
| 2011/0041280 | A1 * | 2/2011 | Choi | B60S 1/3858 15/250.361 |
| 2014/0230175 | A1 * | 8/2014 | Kim | B60S 1/387 15/250.32 |

FOREIGN PATENT DOCUMENTS

| | | | |
|---|---|---|---|
| GB | 2450619 | * | 10/2011 |
| WO | 2011/120232 | * | 10/2011 |

* cited by examiner

*Primary Examiner* — Gary Graham

(57) ABSTRACT

A windshield wiper connector includes a connecting plate, a connector main body, and a lock member. The connecting plate has a lock hole, a first limit protrusion, and a second protrusion. The connector main body has a connecting part for connecting a wiper arm. The connector main body has a first flange, a second flange, a first limit slot, a second limit slot, and at least one elastic claw. The lock member is to fix the connecting plate to a wiper rod. The present invention can use all the useful parts, and the connecting part is adjustably designed so it can be used widely.

10 Claims, 30 Drawing Sheets

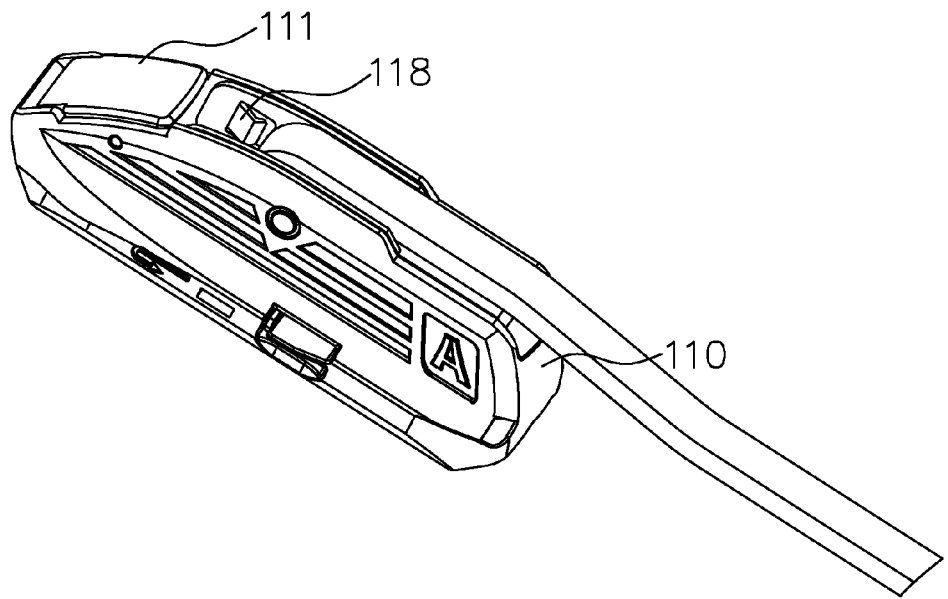
F I G. 7
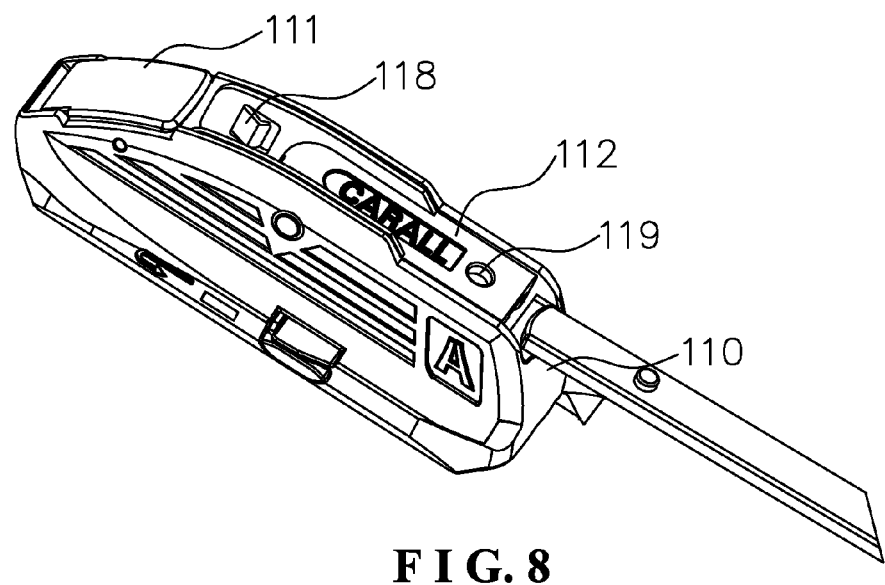
F I G. 8

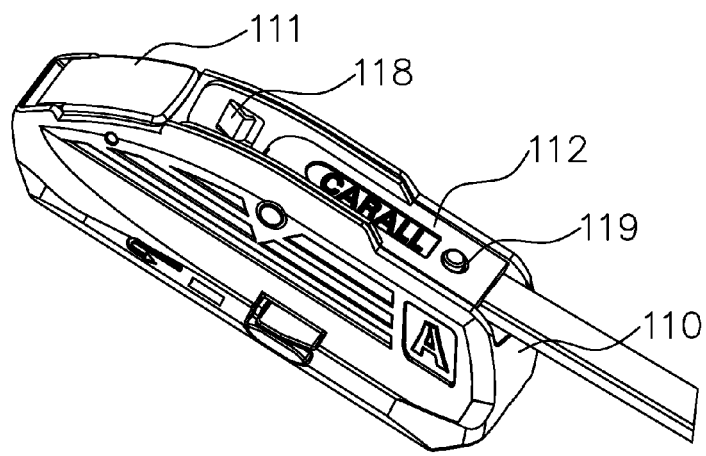
F I G. 8A
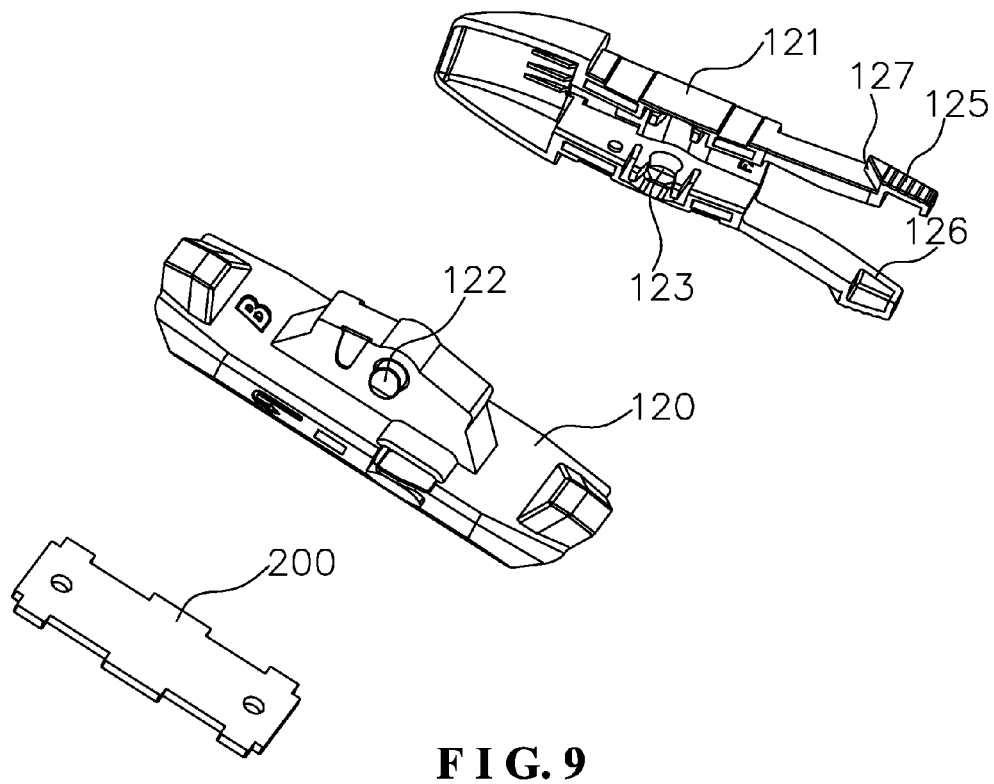
F I G. 9

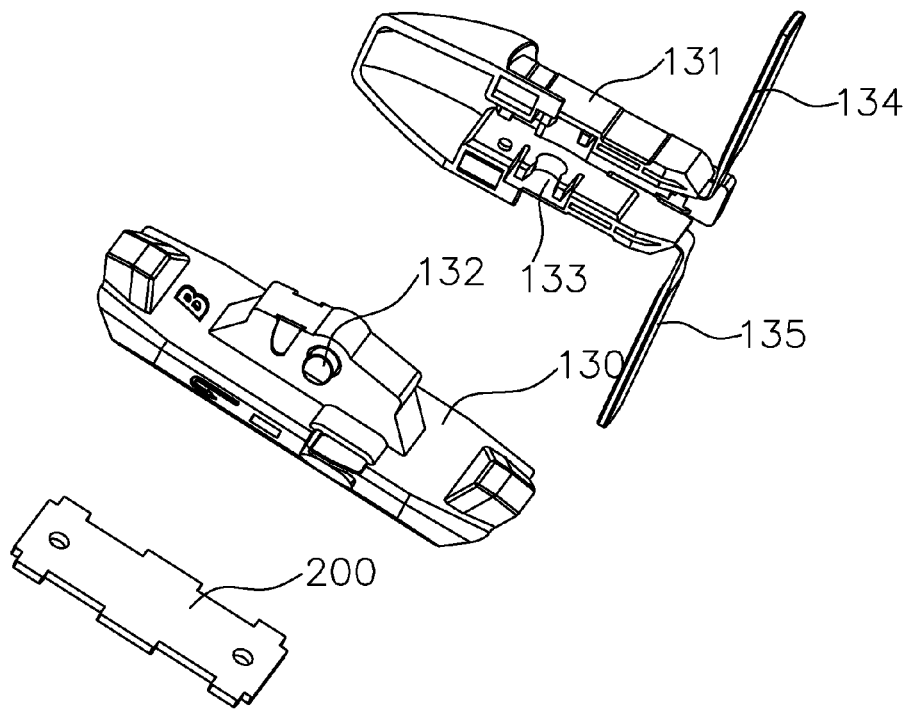
F I G. 12
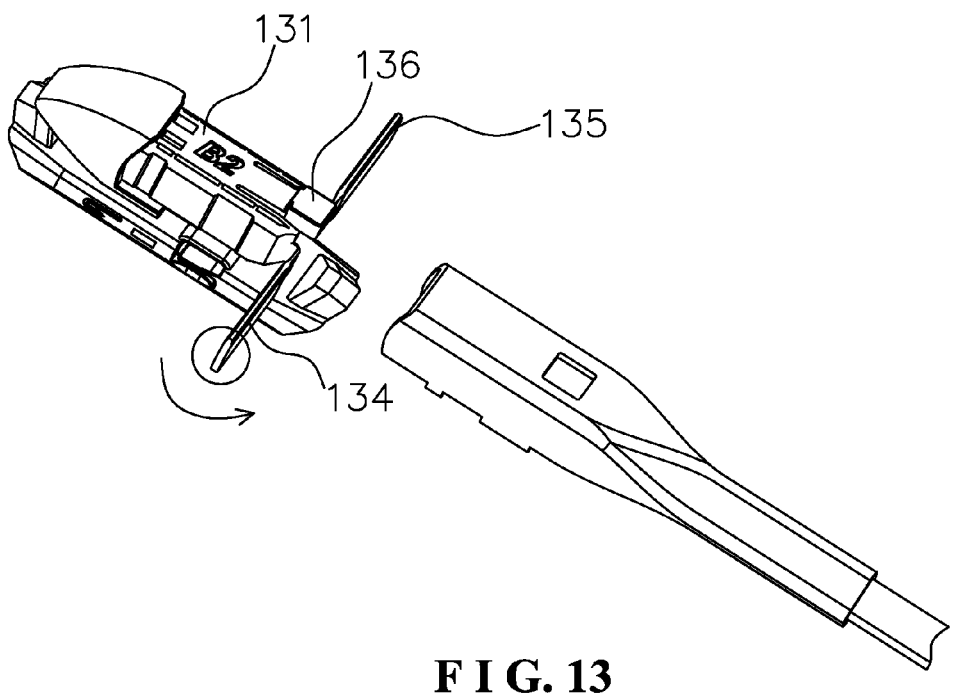
F I G. 13

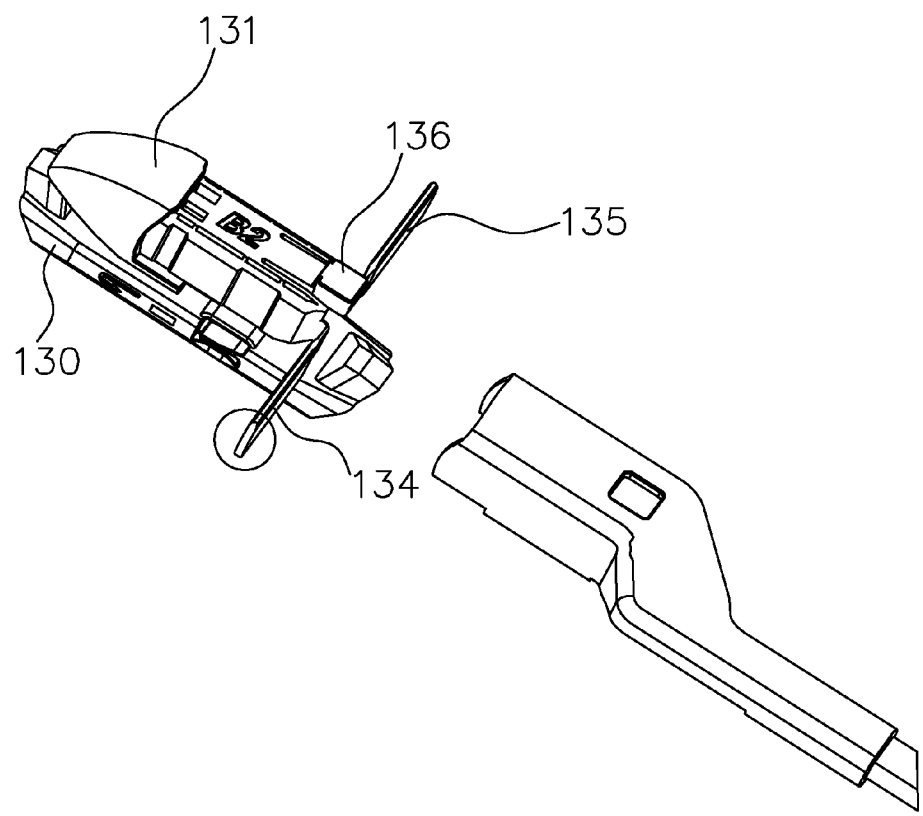
F I G. 16
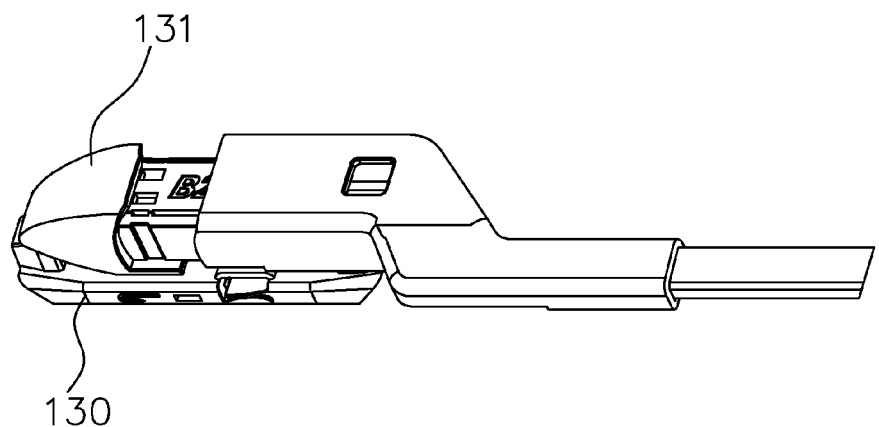
F I G. 17

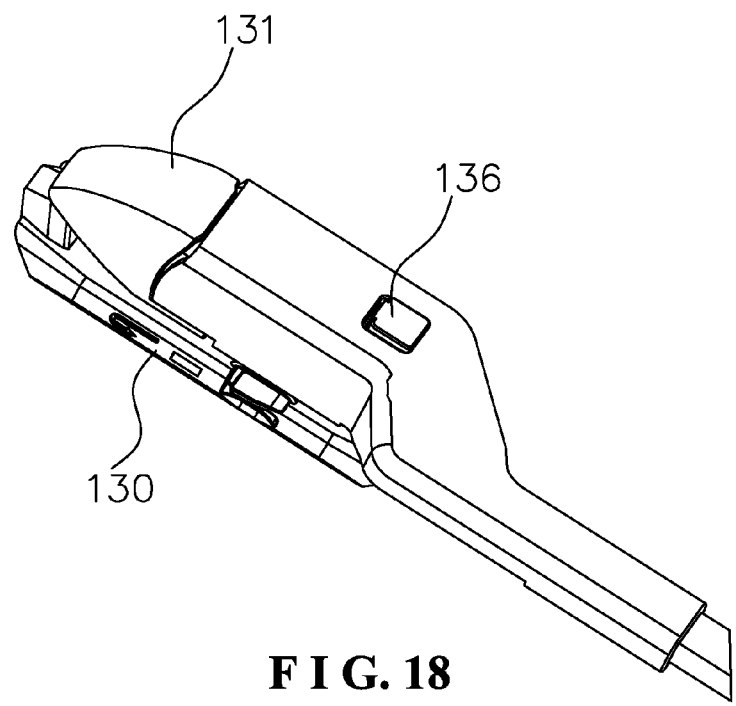
F I G. 18
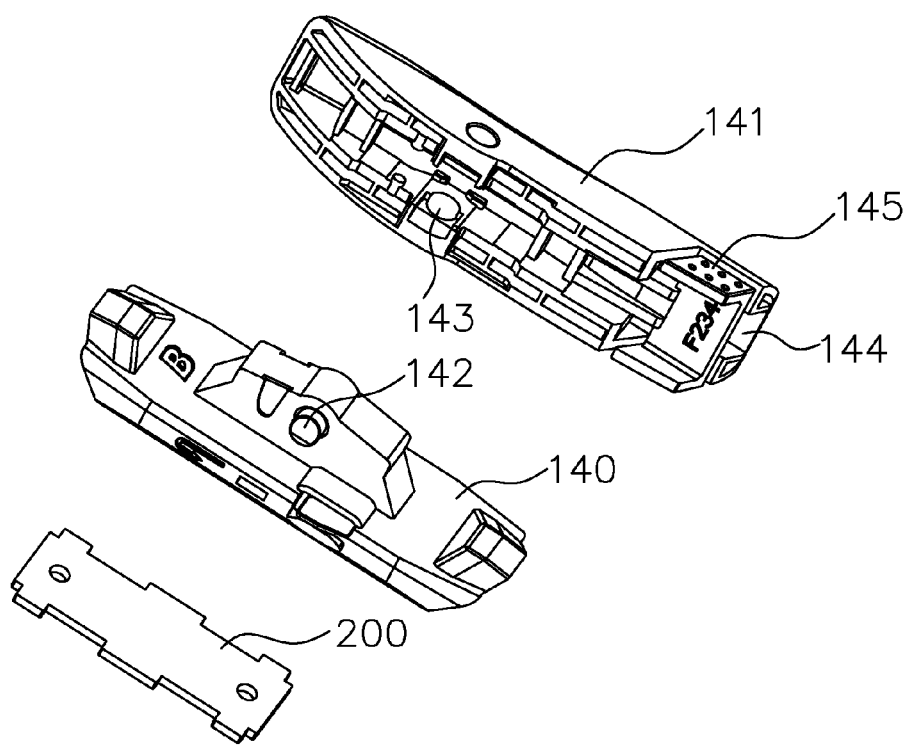
F I G. 19

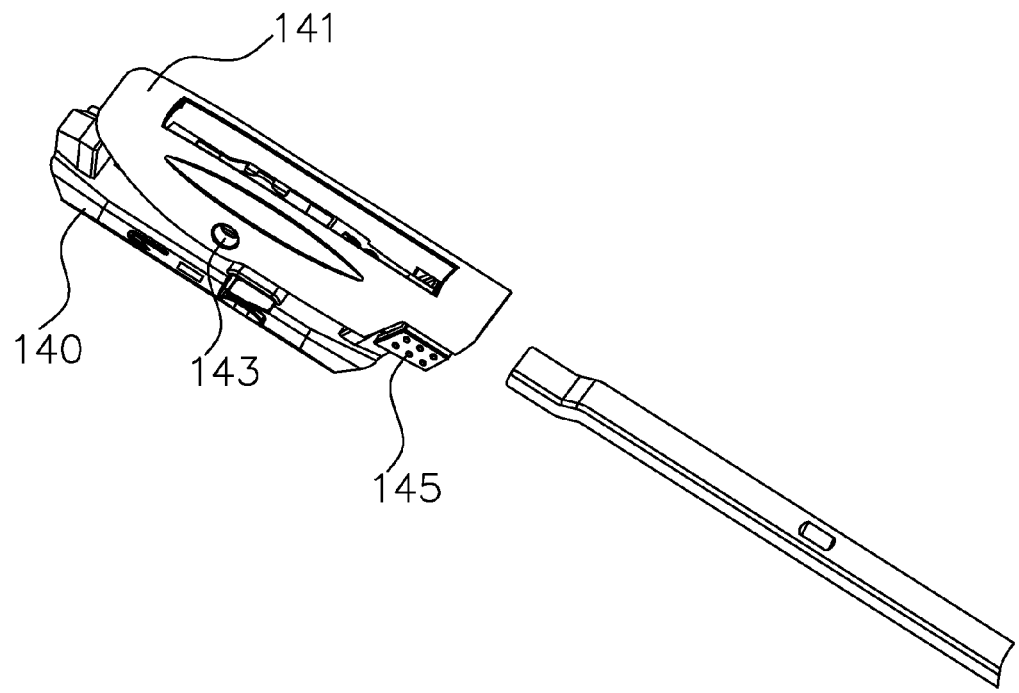
F I G. 20
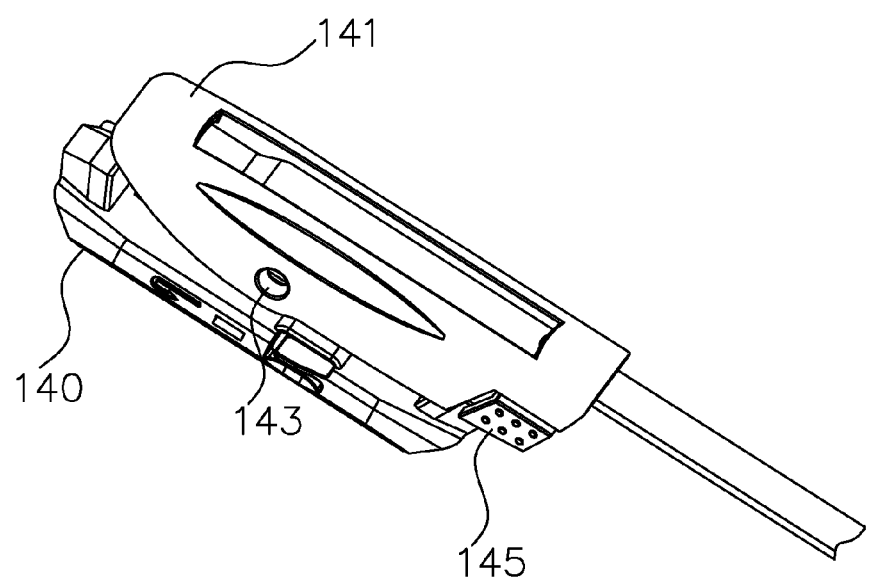
F I G. 21

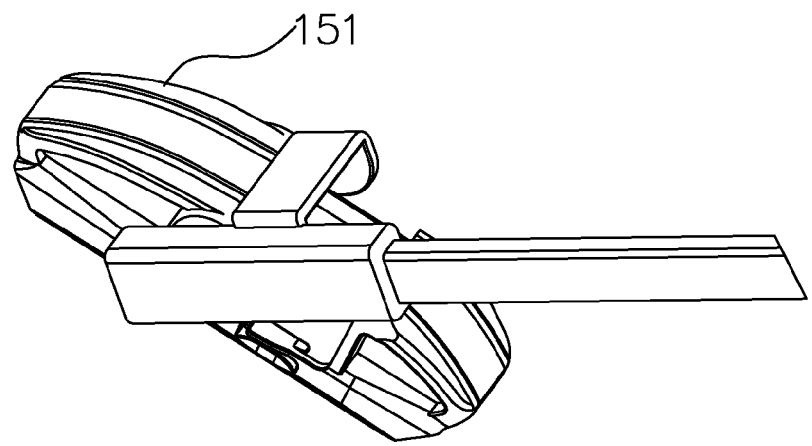
F I G. 28
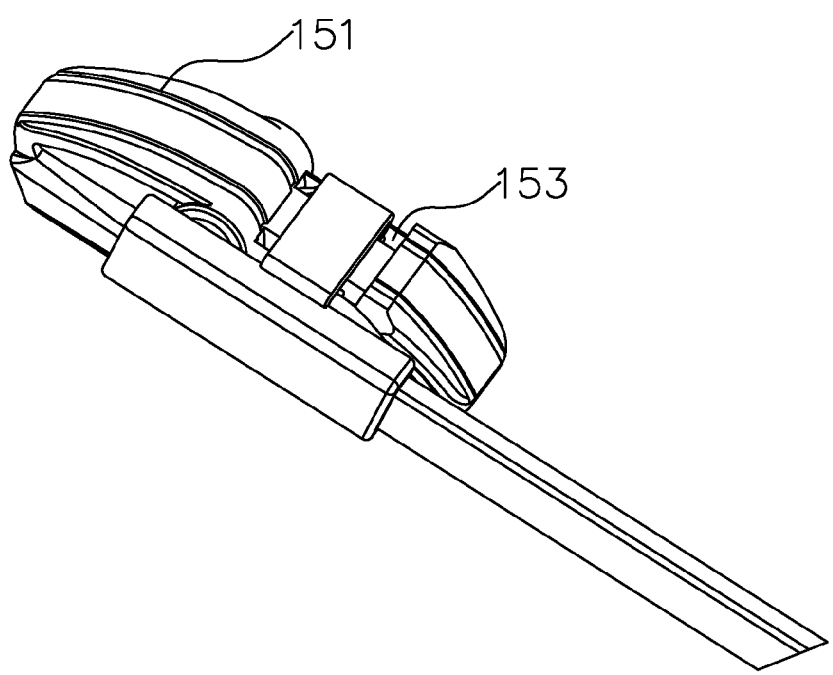
F I G. 29

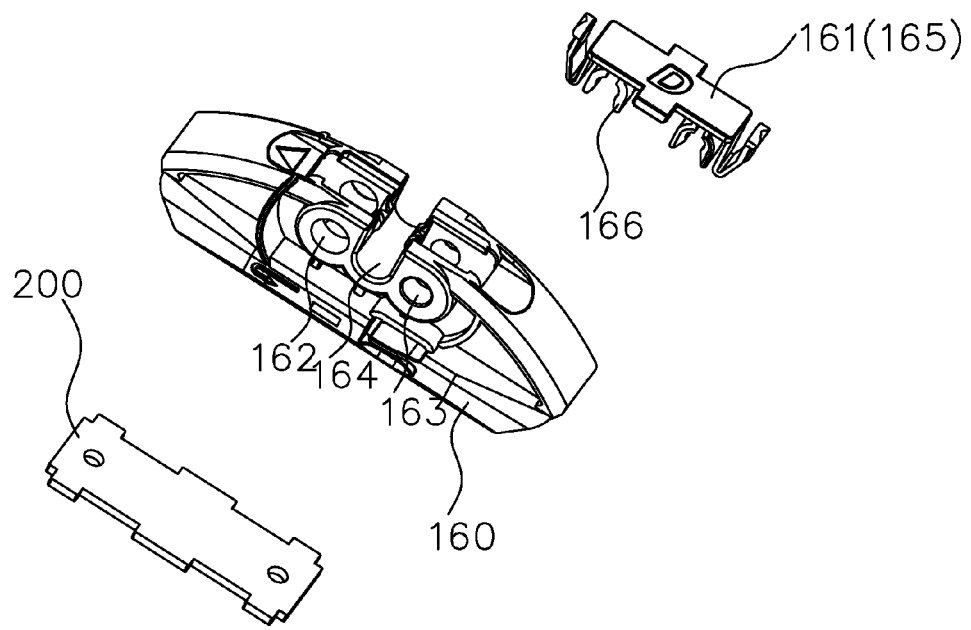
F I G. 30
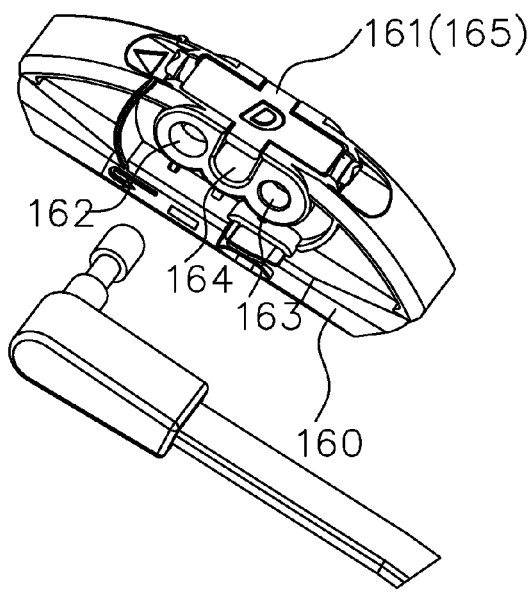
F I G. 31

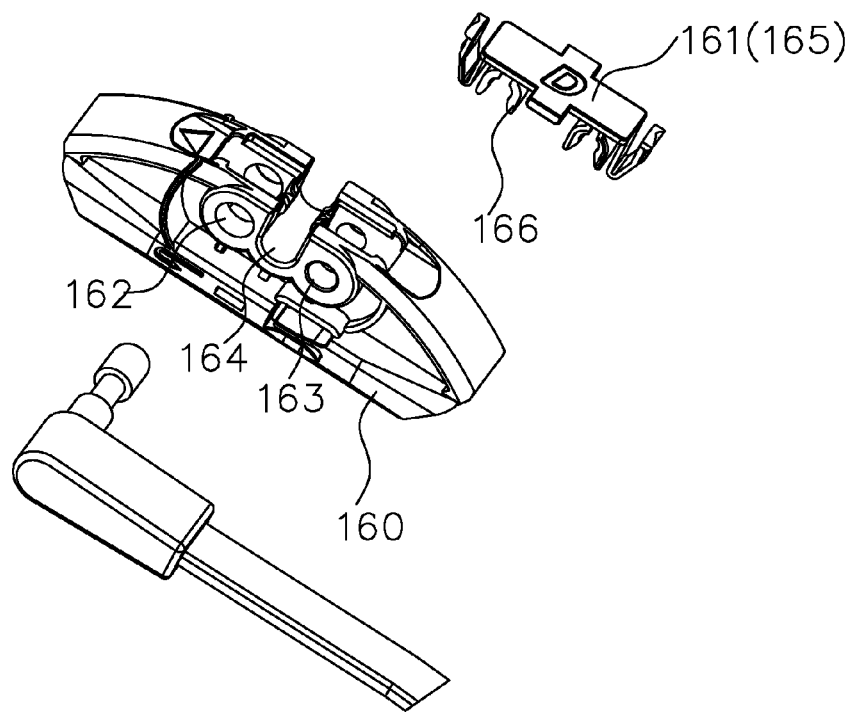
F I G. 32
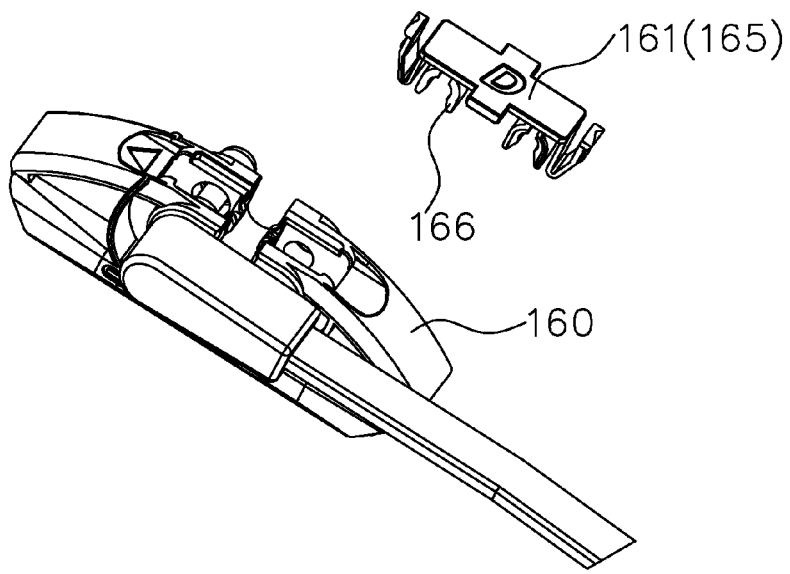
F I G. 33

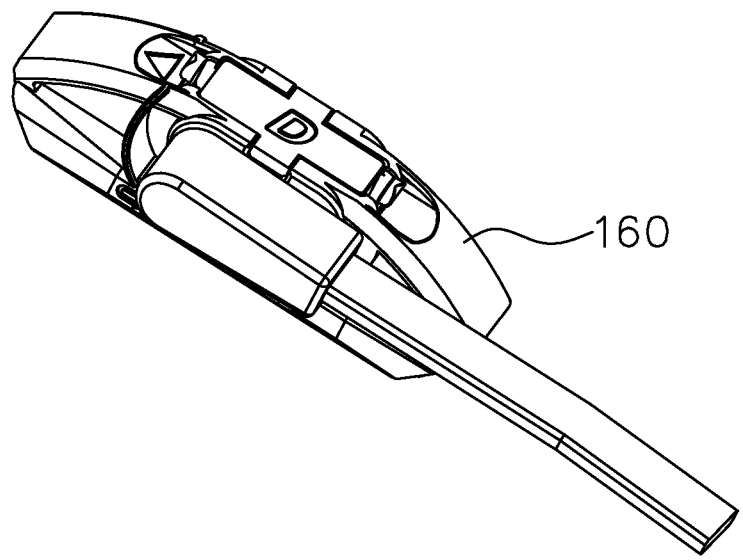
F I G. 34
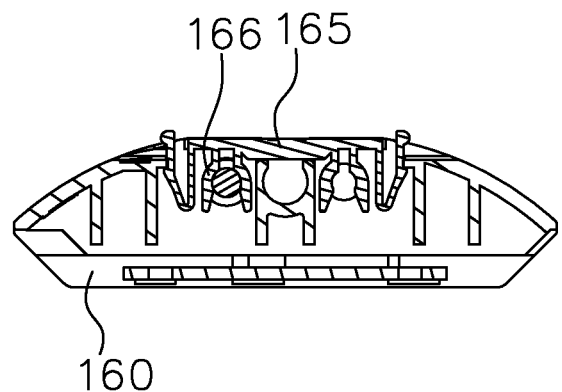
F I G. 35

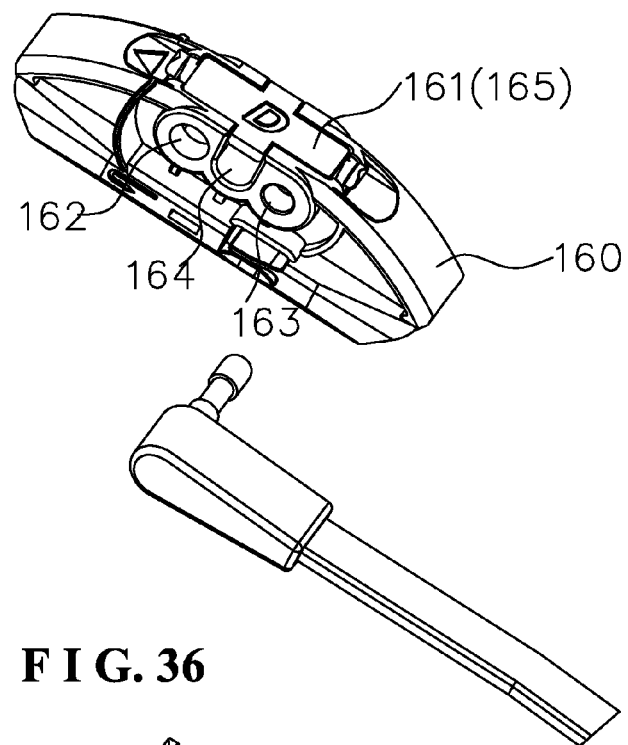
F I G. 36
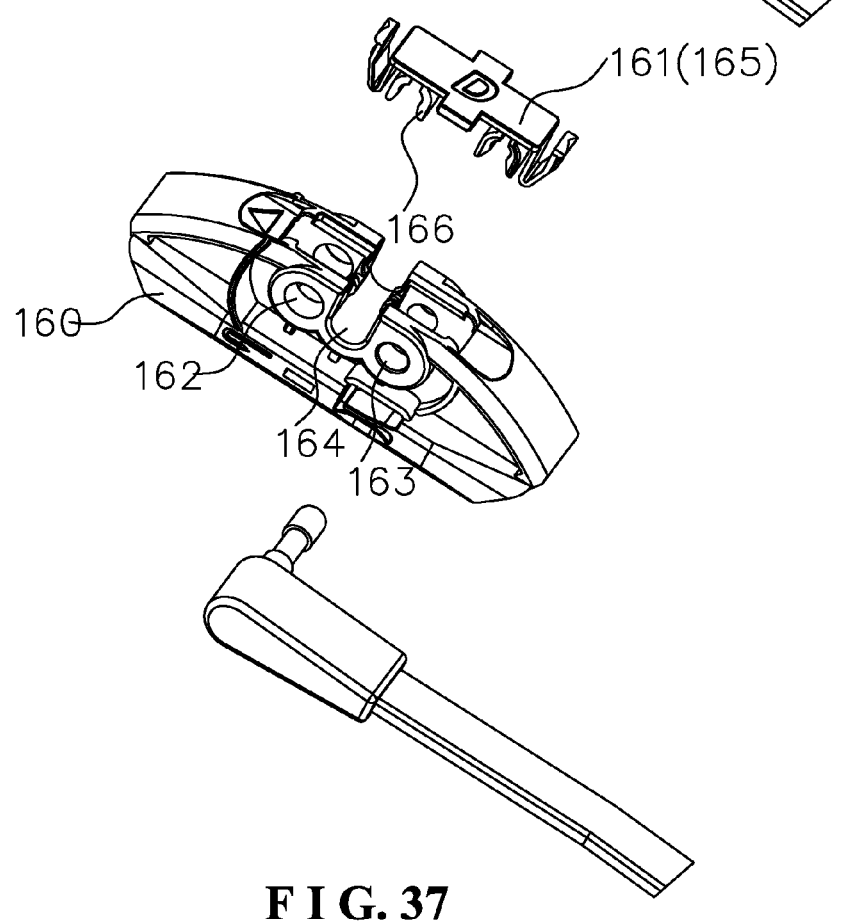
F I G. 37

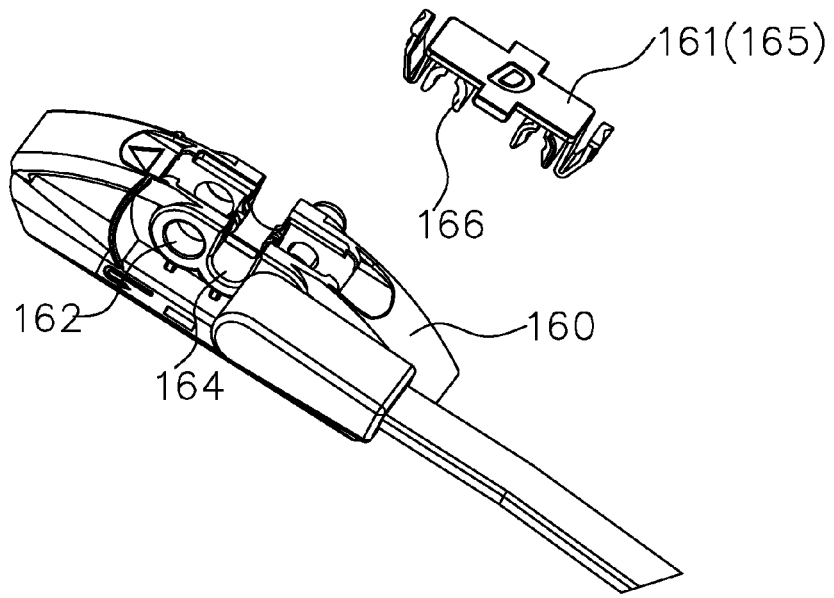
F I G. 38
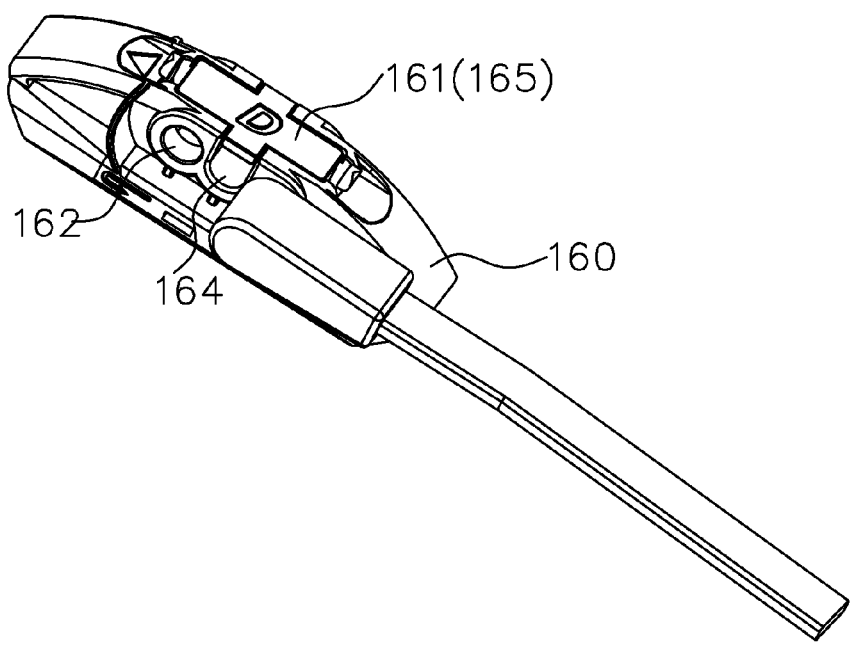
F I G. 39

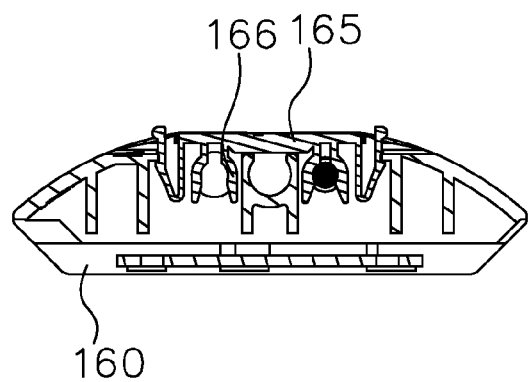
F I G. 40
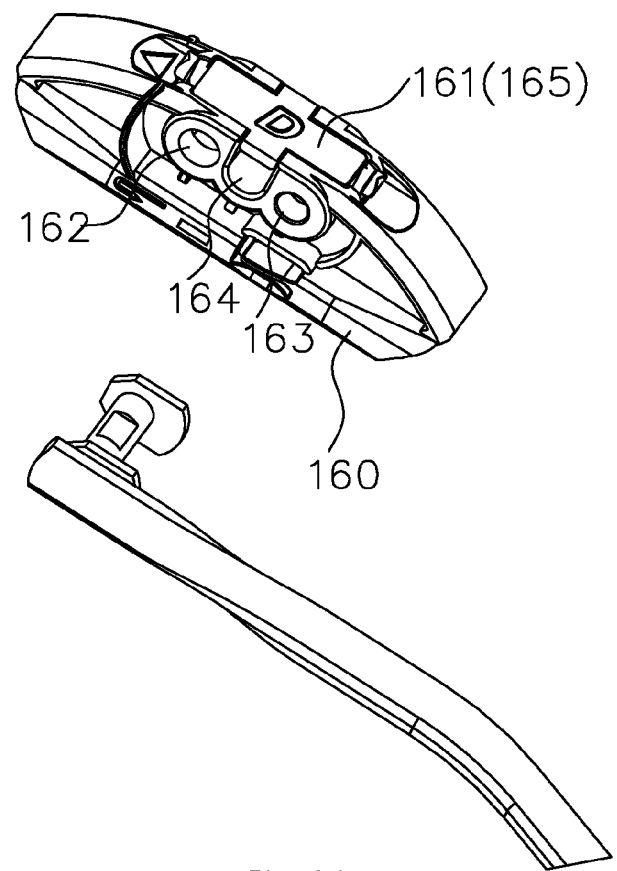
F I G. 41

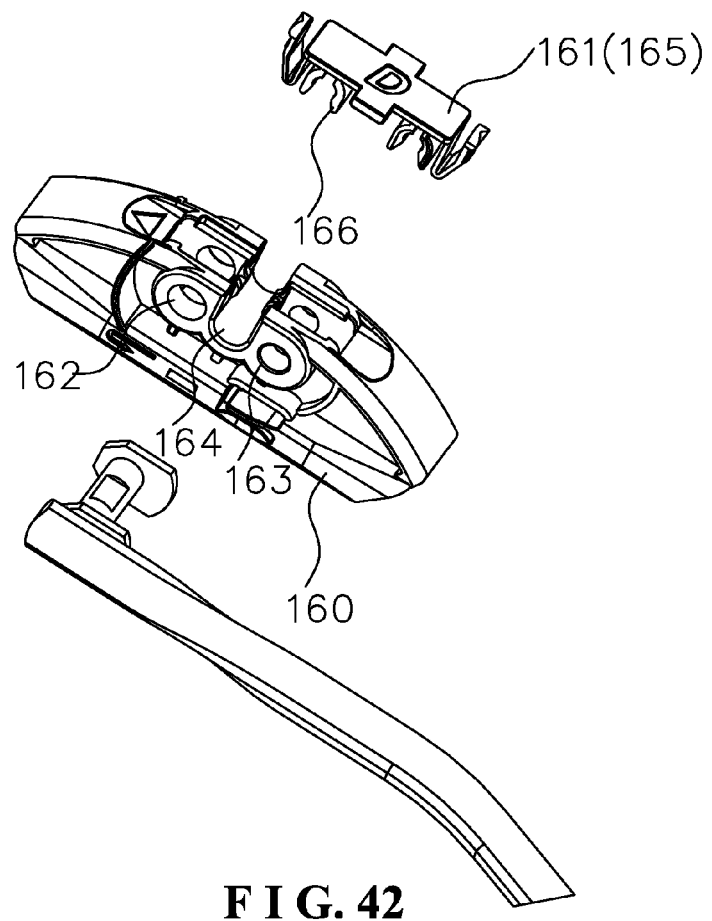
F I G. 42
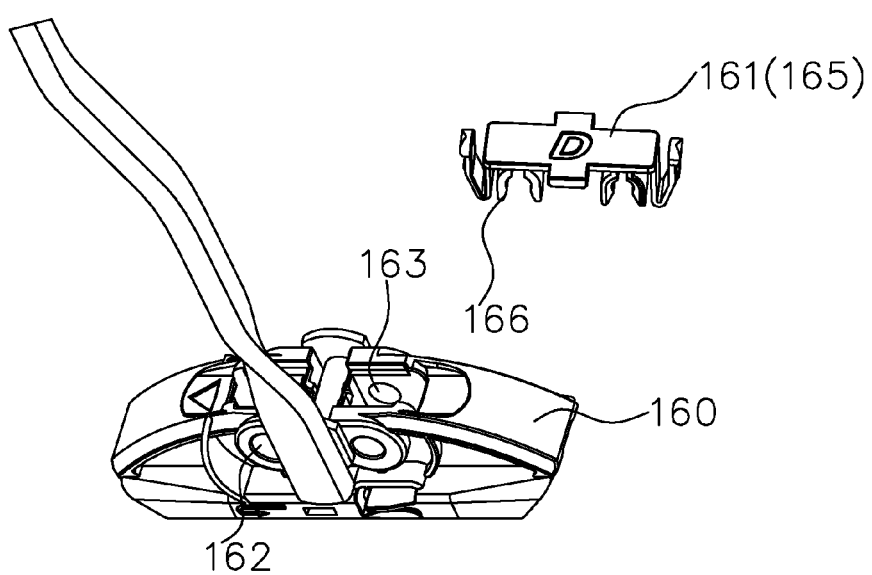
F I G. 43

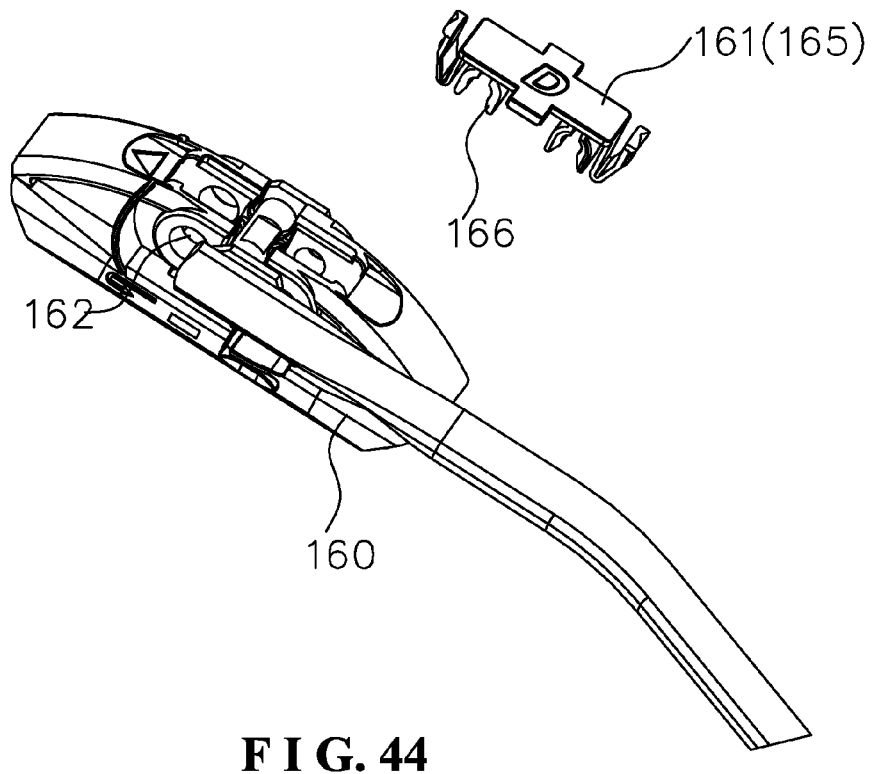
F I G. 44
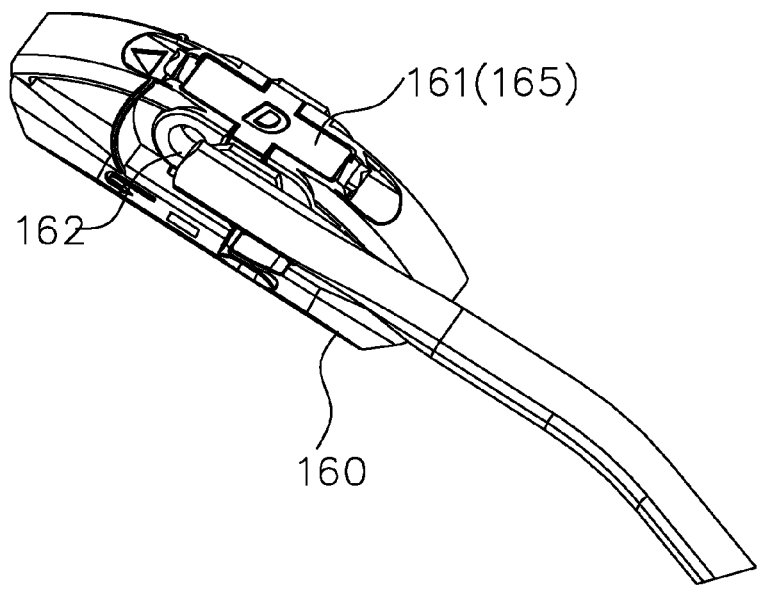
F I G. 45

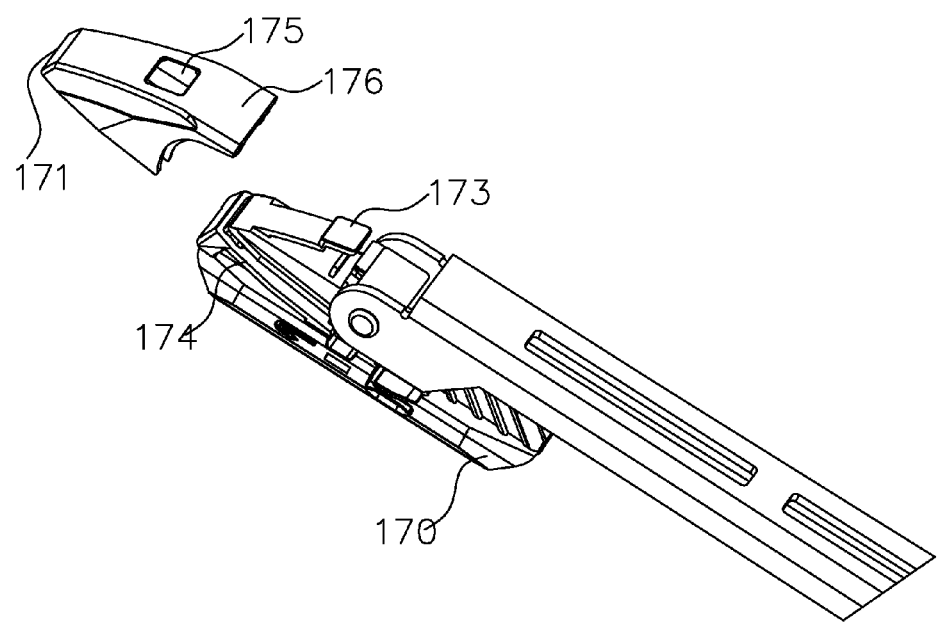
F I G. 50
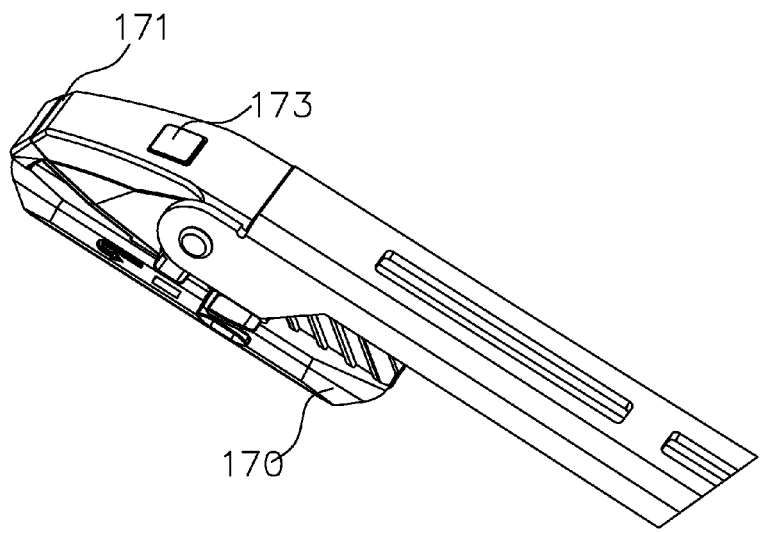
F I G. 51

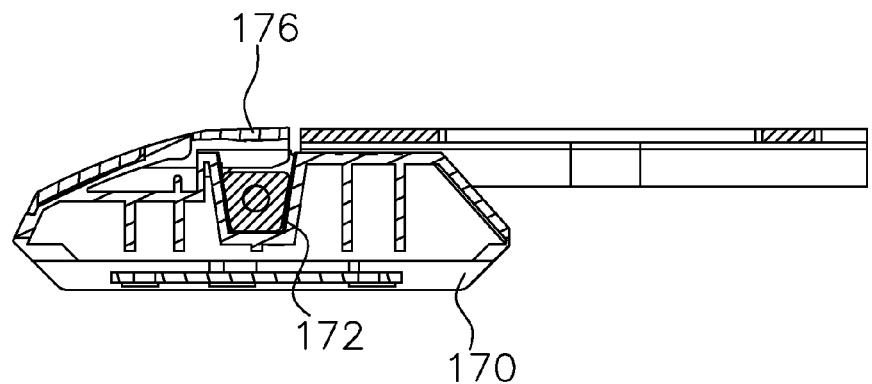
F I G. 52
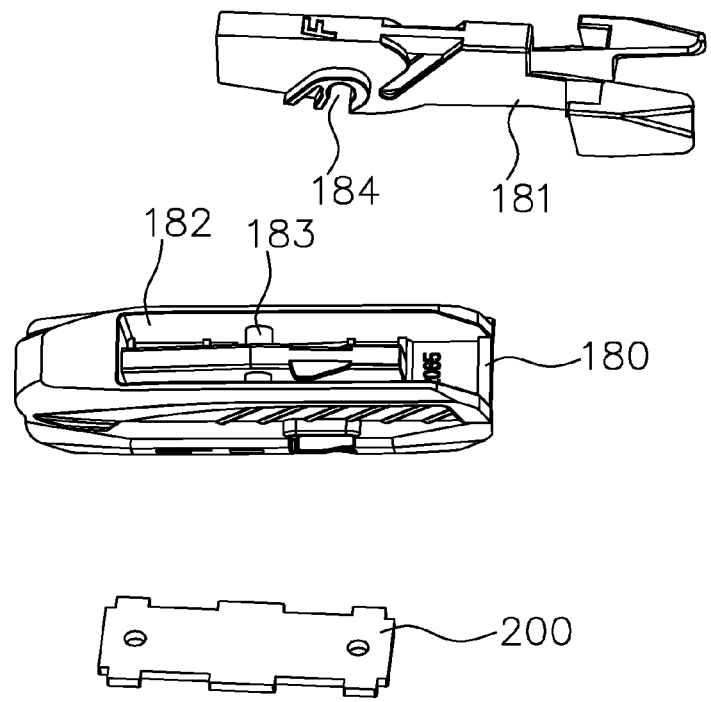
F I G. 53

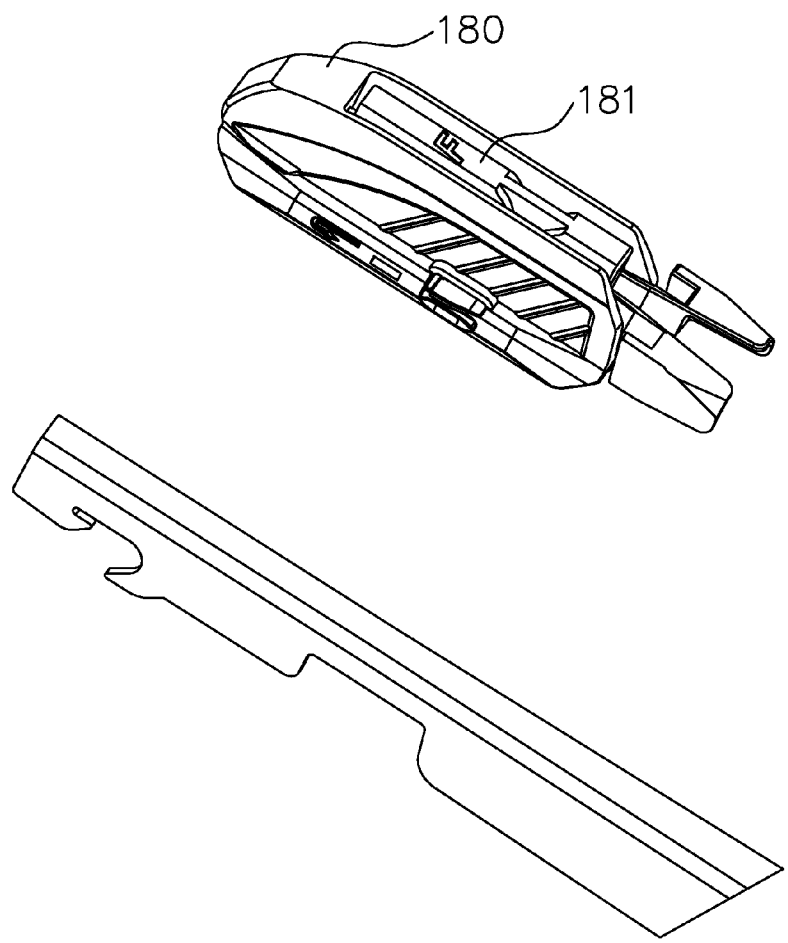
F I G. 54
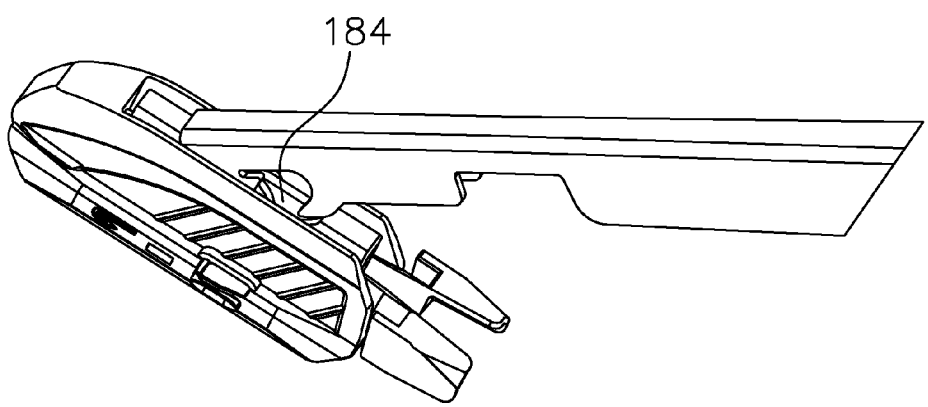
F I G. 55

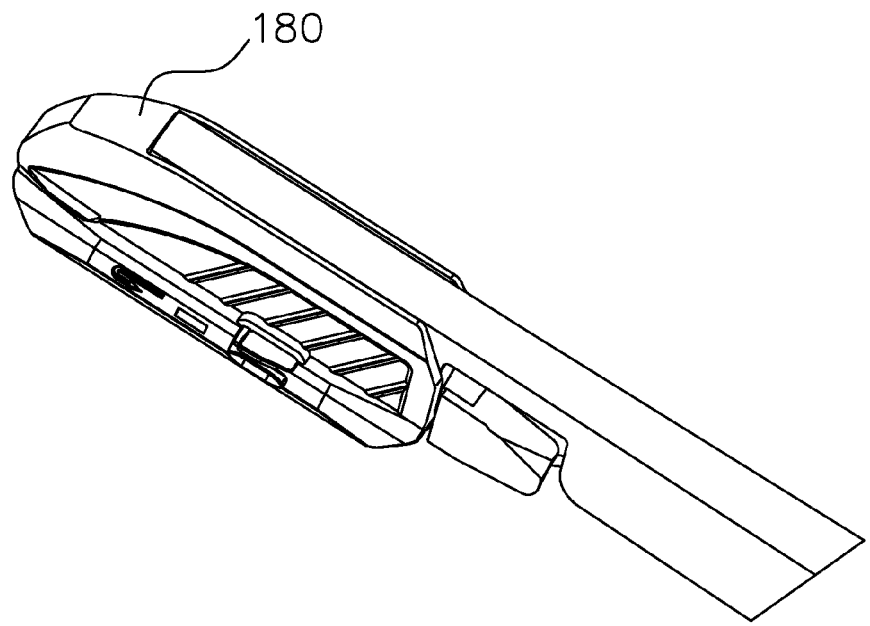
F I G. 56
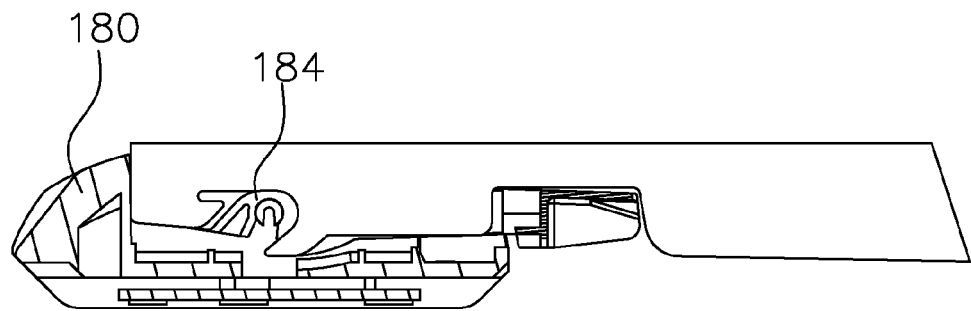
F I G. 57

WINDSHIELD WIPER CONNECTOR

BACKGROUND OF THE INVENTION

1. Field of the Invention

The present invention relates to a windshield wiper, and more particularly to a windshield wiper connector for connecting a wiper rod and a wiper arm of the windshield wiper.

2. Description of the Prior Art

A windshield wiper is used to scrape rainwater or dust on the windshield. The windshield wiper comprises a motor, a wiper arm, a windshield wiper connector and a wiper rod. The output shaft of the motor is connected with the wiper arm. The wiper arm is connected with the wiper rod through the windshield wiper connector. In general, the windshield wiper connector is designed according to the structure of the wiper arm. The windshield wiper connector comprises a fixing seat and a coupling. The fixing seat is fixed to the middle of the wiper rod. The coupling is is mounted on the fixing seat. After the fixing seat and the coupling are assembled, the windshield wiper connector is to connect the wiper arm. The windshield wiper connector is fixedly connected, namely, the fixing seat is welded or riveted on the wiper rod, and the coupling is fixed on the fixing seat through a rivet.

When the wiper rod is partially damaged or the windshield wiper connector is partially damaged, the whole windshield wiper must be replaced with a new one. This causes a waste. Besides, the wiper arm cannot be designed for different brands or vehicle models. The consumers may worry about the applicability of the windshield wiper when purchasing a new windshield wiper.

Accordingly, the inventor of the present invention has devoted himself based on his many years of practical experiences to solve this problem.

SUMMARY OF THE INVENTION

The primary object of the present invention is to provide a windshield wiper connector which can be applied to various windshield wiper arms and used widely.

In order to achieve the aforesaid object, the windshield wiper connector of the present invention comprises a connecting plate, a connector main body, and a lock member. The connecting plate has a lock hole, a first limit protrusion, and a second protrusion. The lock hole penetrates through the upper and lower surfaces of the connecting plate. The first limit protrusion and the second protrusion are respectively located at two sides of the connecting plate and protrude in the direction of the width of a wiper rod of a windshield wiper. The connector main body has a connecting part for connecting a wiper arm. The connector main body has a first flange and a second flange formed at two sides of the bottom of the connector main body and extending along the direction of the length of the wiper rod of the windshield wiper. The inner walls of the first flange and the second flange are formed with a first limit slot and a second limit slot, respectively. The first limit slot and the second limit slot are respectively to receive the first limit protrusion and the second protrusion. The connector main body is further formed with at least one is elastic detent. Wherein, when the first limit protrusion slides along the first limit slot, the at least one elastic detent is held by the first limit protrusion. After the first limit protrusion fully mates with the first limit slot, the at least one elastic detent is restored to hold against the edge of the first limit protrusion. The lock member passes through the lock hole to fix the connecting plate to the wiper rod.

Preferably, the connecting plate is formed with three spaced first limit protrusions and three spaced second limit protrusions, and the inner walls of the first flange and the second flange are formed with three first limit slots and three second limit slots, respectively.

Preferably, the connecting part has a first fixing seat, a first upper cover, and a first upper coupling. The first flange and the second flange are formed at the bottom of the first fixing seat. The first fixing seat has a first opening at a top thereof, a first pivot and a second pivot in the first opening. The first pivot is located at one end of the first fixing seat. The second pivot is located at a central portion of the first fixing seat. The first upper cover is pivotally connected to the first fixing seat through the first pivot. The first upper coupling is coupled to the second pivot. A front portion of the first upper coupling is formed with a first ear and a second ear. The inner surfaces of the first ear and the second ear are formed with elastic engaging portions facing each other. A rear portion of the first upper coupling is formed with a first positioning hole.

Preferably, the connecting part has a second fixing seat and a second upper coupling. The second fixing seat has a third pivot thereon. The inner walls of two sides of the second upper coupling are formed with a pair of first positioning recesses to mate with the third pivot. A front portion of the second upper coupling is formed with a second opening for insertion of the wiper arm. A rear portion of the second upper coupling is formed with a first elastic engaging arm and a second elastic engaging arm. The first elastic engaging arm and the second elastic engaging arm each have a first wedge surface.

Preferably, the connecting part has a third fixing seat and a third upper coupling. The third fixing seat has a fourth pivot thereon. The inner walls of two sides of the third upper coupling are formed with a pair of second positioning recesses to mate with the fourth pivot. Two sides of a rear portion of the third upper coupling are formed with a third elastic engaging arm and a fourth elastic engaging arm. The middle of the rear portion of the third upper coupling is formed with a first elastic engaging platform.

Preferably, the connecting part has a fourth fixing seat and a fourth upper coupling. The fourth fixing seat has a fifth pivot thereon. The inner walls of two sides of the fourth upper coupling are formed with a pair of third positioning recesses to mate with the fifth pivot. A rear portion of the fourth upper coupling is formed with a receiving hole and a fifth elastic engaging arm under the receiving hole. The fifth elastic engaging arm is formed with a raised rib. An outer end of the raised rib, close to the receiving hole, has a second wedge surface.

Preferably, the connecting part has a fifth fixing seat, a fifth upper coupling, and a first pivot hole formed between the fifth fixing seat and the fifth upper coupling. The fifth upper coupling is formed with a U-shaped concave portion.

Preferably, the connecting part has a sixth fixing seat and a sixth upper coupling. The sixth fixing seat has a second pivot hole, a third pivot hole, and a first U-shaped trough formed between the second pivot hole and the third pivot hole. The second pivot hole and the third pivot hole each are divided into two spaced sections along the direction of the width of the wiper rod of the windshield wiper. The sixth upper coupling has a lid and elastic claws connected under the lid. The elastic claws are located between the two spaced sections of the first pivot hole or the two spaced sections of the second pivot hole for fixing the wiper arm.

Preferably, the connecting part has a seventh fixing seat and a seventh upper coupling. The seventh fixing seat is formed with a third opening for a turning pivot of the wiper arm to traverse therethrogh. The seventh fixing seat is further formed with a second elastic engaging platform at a middle portion in front of the third opening. The seventh fixing seat is further formed with slide rails at two sides of a front end thereof. The seventh upper coupling is formed with a second positioning hole and a shield located behind the second positioning hole. Wherein, the seventh upper coupling is slid along the slide rails to be positioned by the second positioning hole to engage with the second elastic engaging platform, and the shield is adapted to cover the third opening when the second positioning hole is engaged with the second elastic engaging platform.

Preferably, the connecting part has an eighth fixing seat and an inner coupling. The eighth fixing seat has a fourth opening and a six pivot. The inner coupling is inserted in the fourth opening through the six pivot. The inner coupling is formed with two engaging troughs for insertion of engaging blocks of the wiper arm.

Thus, the connecting plate of the windshield wiper connector of the present invention is first fixed to the wiper rod by the lock member. After that, the first limit protrusion and the second limit protrusion are respectively inserted into the first limit slot and the second limit slot of the connector main body. During insertion, the elastic detent is held by the first limit protrusion. After the first limit protrusion fully mates with the first limit slot, the elastic detent is restored and blocks the first limit protrusion so that the connector main body and the connecting plate are connected stably. When it is necessary to detach the connector main body from the connecting plate, the elastic detent is lifted and the connector main body is moved to detach the connector main body from the connecting plate. It is very convenient to assemble or disassemble the present invention, and all the useful parts can be reused to lower the waste.

The connecting part of the connector main body can be designed according to the actual demand for different brands or vehicle models to enhance its applicability. The present invention can be used widely, without worrying about the applicability of the windshield wiper connector.

BRIEF DESCRIPTION OF THE DRAWINGS

FIG. 4 to FIG. 7 are schematic views showing the first embodiment of the present invention connected with a hooked wiper arm;

FIG. 8 and FIG. 8A are schematic views showing the first embodiment of the present invention connected with a straight insertion rod;

FIG. 9 is a schematic view showing a second embodiment of the windshield wiper connector of the present invention;

FIG. 12 is a schematic view showing a third embodiment of the windshield wiper is connector of the present invention;

FIG. 13 to FIG. 15 are schematic views showing the third embodiment of the present invention connected with a wiper arm;

FIG. 16 to FIG. 18 are schematic views showing the third embodiment of the present invention connected with another wiper arm;

FIG. 19 is a schematic view showing a fourth embodiment of the windshield wiper connector of the present invention;

FIG. 20 to FIG. 22 are schematic views showing the fourth embodiment of the present invention connected with a wiper arm;

FIG. 27 to FIG. 29 are schematic views showing the fifth embodiment of the present invention connected with another wiper arm;

FIG. 30 is a schematic view showing a sixth embodiment of the windshield wiper connector of the present invention;

FIG. 31 to FIG. 35 are schematic views showing the sixth embodiment of the present invention connected with a wiper arm;

FIG. 36 to FIG. 40 are schematic views showing the sixth embodiment of the present invention connected with another wiper arm;

FIG. 41 to FIG. 46 are schematic views showing the sixth embodiment of the present invention connected with another wiper arm;

FIG. 48 to FIG. 52 are schematic views showing the seventh embodiment of the present invention connected with a wiper arm;

FIG. 53 is a schematic view showing an eighth embodiment of the windshield wiper connector of the present invention; and FIG. 54 to FIG. 57 are schematic views showing the eight embodiment of the present invention connected with a wiper arm.

DETAILED DESCRIPTION OF THE PREFERRED EMBODIMENTS

Embodiments of the present invention will now be described, by way of example only, with reference to the accompanying drawings.

Figure 1:
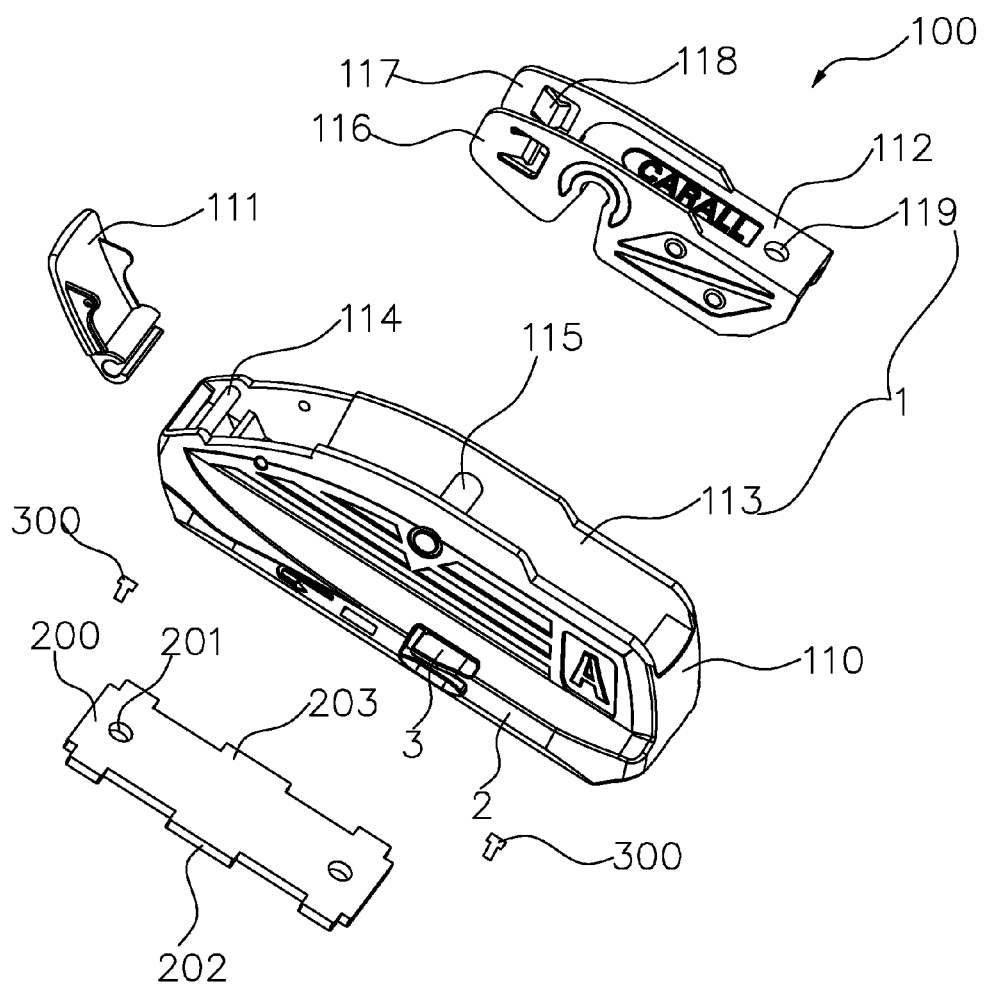
FIG. 1 to FIG. 3 are schematic views showing a first embodiment of the windshield wiper connector of the present invention.

FIG. 1 to FIG. 57 are schematic views of various embodiments of the windshield wiper connector of the present invention. The windshield wiper connector comprises a connecting plate 200, a connector main body 100 and a lock member 300.

The connecting plate 200 has a lock hole 201, a first limit protrusion 202, and a second protrusion 203. The lock hole 201 penetrates through upper and lower surfaces of the connecting plate 200. The first limit protrusion 202 and the second protrusion 203 are respectively located at two sides of the connecting plate 200, and protrude in the direction of the width of the wiper rod of the windshield wiper.

The connector main body 100 has a connecting part 1 for connecting a wiper arm. The connector main body 100 has a first flange 2 and a second flange (not numbered in the drawings) which are formed at two sides of the bottom of the connector main body 100 and extend along the direction of the length of the wiper rod of the windshield wiper. The inner walls of the first flange 2 and the second flange are respectively formed with a first limit slot 21 and a second limit slot. The first limit slot 21 and the second limit slot are to receive the first limit protrusion 202 and the second protrusion 203, respectively. The connector main body 100 is further formed with at least one elastic detent 3. When the first limit protrusion 202 slides along the first limit slot 21, the at least one elastic detent 3 is held by the first limit protrusion 202. After the first limit protrusion 202 fully mates with the first limit slot 21, the at least one elastic detent 3 is restored to hold against the edge of the first limit protrusion 202.

The lock member 300 passes through the lock hole 201 to fix the connecting plate 200 to the wiper rod. Preferably, in each embodiment of the present invention, the connecting plate 200 is formed with three spaced first limit protrusions and three spaced second limit protrusions. The inner walls of the first flange 2 and the second flange are formed with three first limit slots 21 and three second limit slots, respectively.

Thus, the connecting plate 200 of the windshield wiper connector of the present invention is first fixed to the wiper rod by the lock member 300. After that, the first limit protrusion 202 and the second limit protrusion 203 are respectively inserted into the first limit slot 21 and the second limit slot of the connector main body 100. During insertion, the elastic detent 3 is held by the first limit protrusion 202. After the first limit protrusion 202 fully mates with the first limit slot 21, the elastic detent 3 is restored and blocks the first limit protrusion 202 so that the connector main body 100 and the connecting plate 200 are connected stably. When it is necessary to detach the connector main body 100 from the connecting plate 200, the elastic detent 3 is lifted and the connector main body 100 is moved to detach the connector main body 100 from the connecting plate 200. It is very convenient to assemble or disassemble the present invention, and all the useful parts can be reused to lower the waste.

The connecting part 1 of the connector main body 100 can be designed according to the actual demand for different brands or vehicle models to enhance its applicability. The present invention can be used widely, without worrying about the applicability of the windshield wiper connector.

Figure 2:
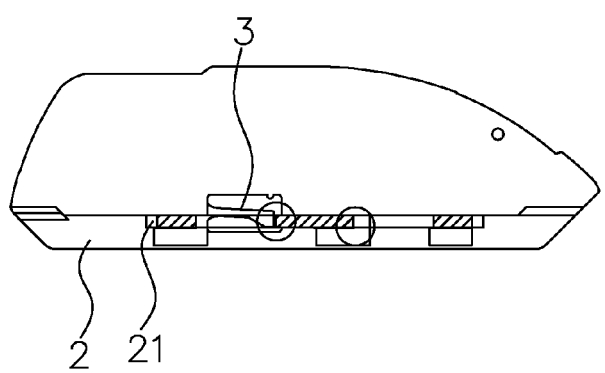
Figure 1A:
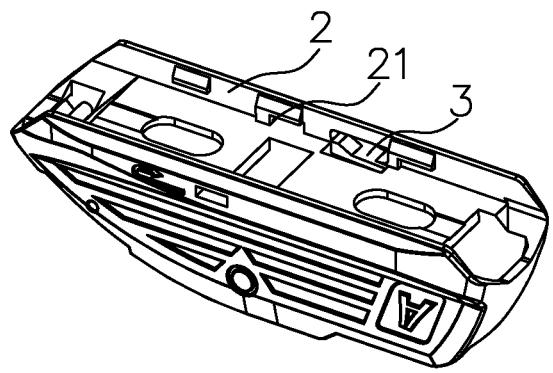
Figure 3:
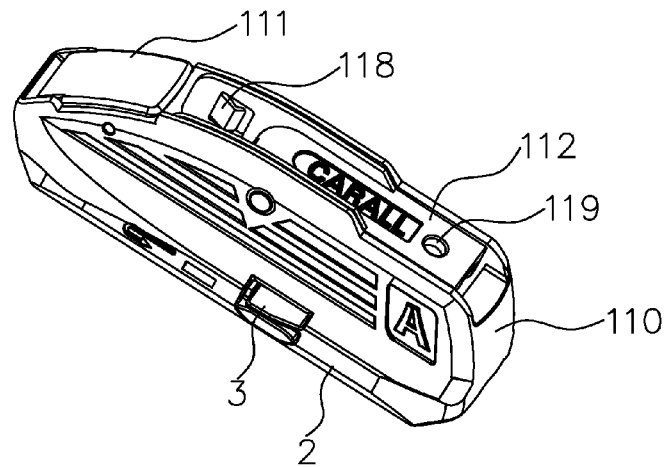

FIG. 1 to FIG. 3 show a first embodiment of the windshield wiper connector of the present invention. In this embodiment, the connecting part 1 has a first fixing seat 110, a first upper cover 111, and a first upper coupling 112. The first flange 2 and the second flange are formed at the bottom of the first fixing seat 110. The first is fixing seat 110 has a first opening 113 at a top thereof, a first pivot 114 and a second pivot 115 in the first opening 113. The first pivot 114 is located at one end of the first fixing seat 110, and the second pivot 115 is located at a central portion of the first fixing seat 110. The first upper cover 111 is pivotally connected to the first fixing seat 110 through the first pivot 114. The first upper coupling 112 is coupled to the second pivot 115. A front portion of the first upper coupling 112 is formed with a first ear 116 and a second ear 117. The inner surfaces of the first ear 116 and the second ear 117 are formed with elastic engaging portions 118 facing each other. A rear portion of the first upper coupling 112 is formed with a first positioning hole 119.

Figure 4:
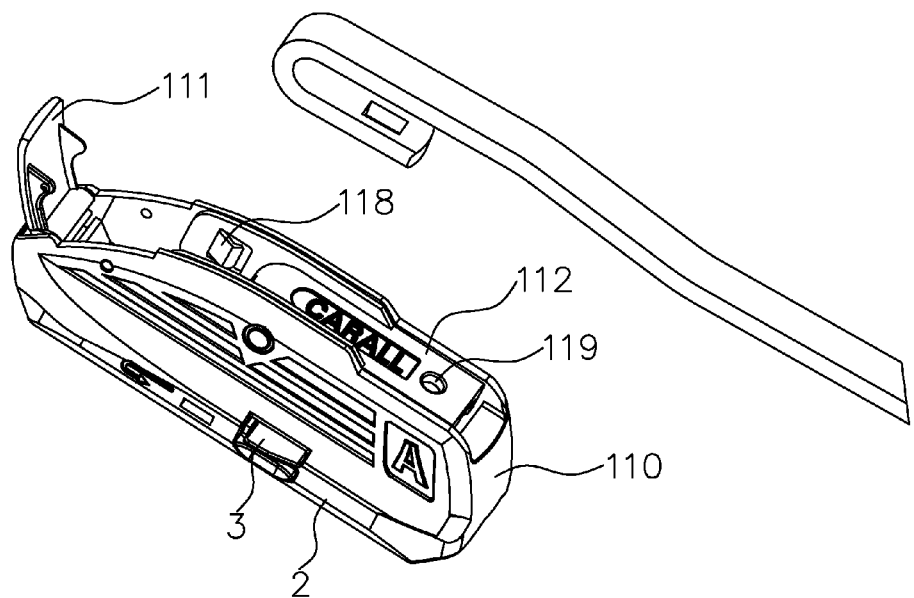
Figure 5:
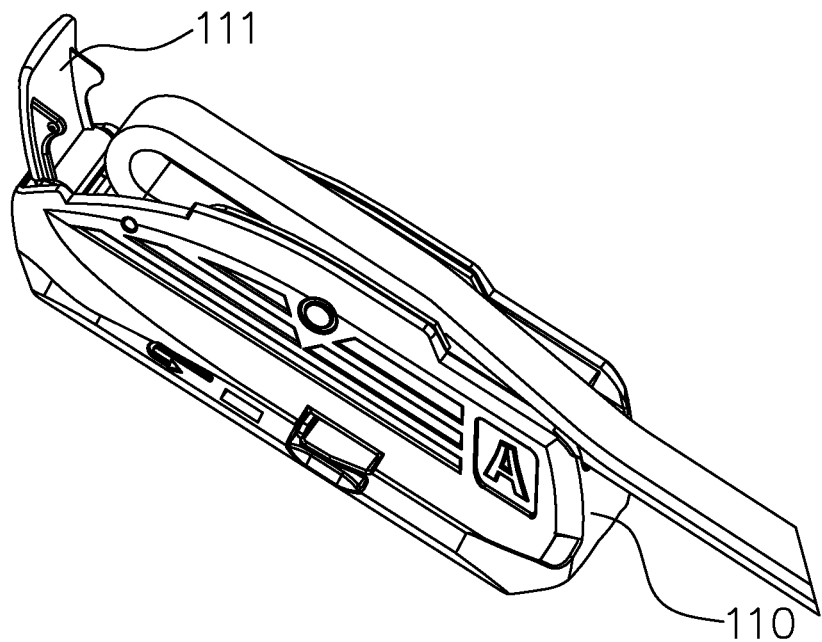
Figure 6:
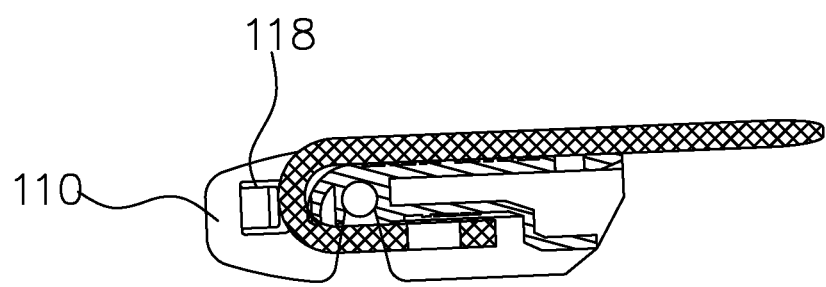

As shown in FIG. 4 to FIG. 7, the first embodiment of the present invention is connected with a hooked wiper arm. As shown in FIG. 4, the first upper cover 111 is opened about the first pivot 114, and the hooked wiper arm is inserted between the first ear 116 and the second ear 117, and then the first upper cover 111 is covered, such that the hooked wiper arm is positioned by the elastic engaging portions 118 of the first ear 116 and the second ear 117, as shown in FIG. 7.

As shown in FIG. 8 and FIG. 8A, the first embodiment of the present invention is connected with a straight insertion rod. By using an elastic protrusion on the straight insertion rod to engage with the first positioning hole 119, the straight insertion rod is positioned precisely.

FIG. 9 shows a second embodiment of the windshield wiper connector of the present invention. In this embodiment, the connecting part 1 has a second fixing seat 120 and a second upper coupling 121. The second fixing seat 120 has a third pivot 122 thereon. The inner walls of two sides of the second upper coupling 121 are formed with a pair of first positioning recesses 123 to mate with the third pivot 122. A front portion of the second upper coupling 121 is formed with a second opening 124 for insertion of the wiper arm. A rear portion of the second upper coupling 121 is formed with a first elastic engaging arm 125 and a second elastic engaging arm 126. The first elastic engaging arm 125 and the second elastic engaging arm 126 each have a first wedge surface 127.

Figure 10:
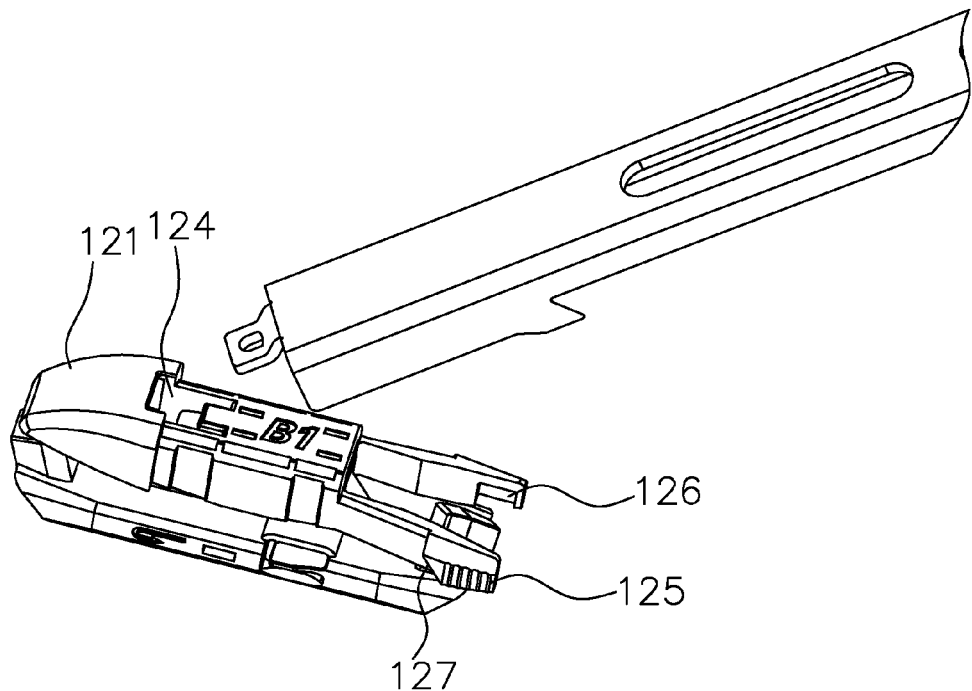
FIG. 10 and FIG. 11 are schematic views showing the windshield wiper connector of the present invention connected with a wiper arm.
Figure 11:
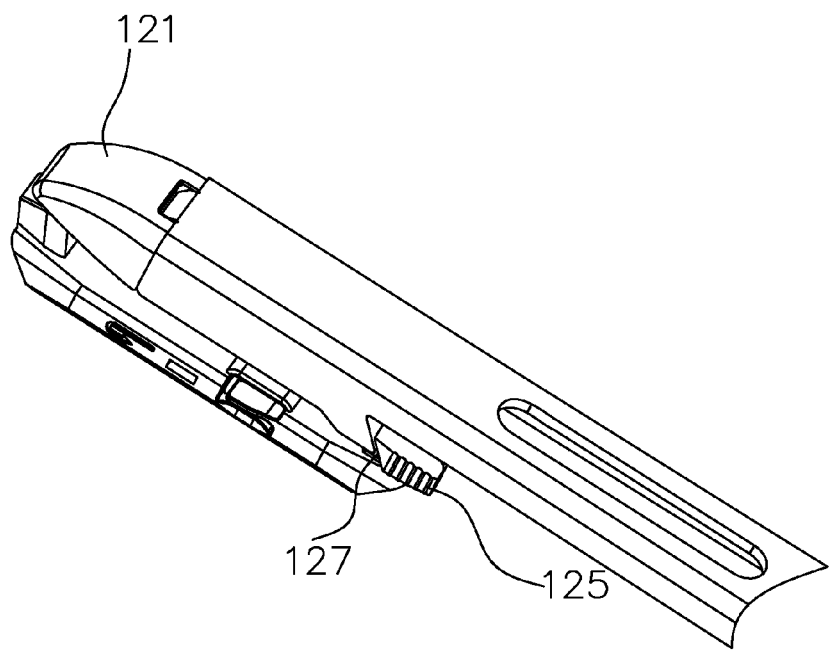

As shown in FIG. 10 and FIG. 11, a wiper arm is first inserted into the second opening 124 of the second upper coupling 121, and then the wiper arm is turned to mate with the first wedge surfaces 127 of first elastic engaging arm 125 and the second elastic engaging arm 126 so as to be positioned.

FIG. 12 shows a third embodiment of the windshield wiper connector of the present invention. In this embodiment, the connecting part 1 has a third fixing seat 130 and a third upper coupling 131. The third fixing seat 130 has a fourth pivot 132 thereon. The inner walls of two sides of the third upper coupling 131 are formed with a pair of second positioning recesses 133 to mate with the fourth pivot 132. Two sides of a rear portion of the third upper coupling 131 is formed with a third elastic engaging arm 134 and a fourth elastic engaging arm 136. The middle of the rear portion of the third upper coupling 131 is formed with a first elastic engaging platform 136.

Figure 14:
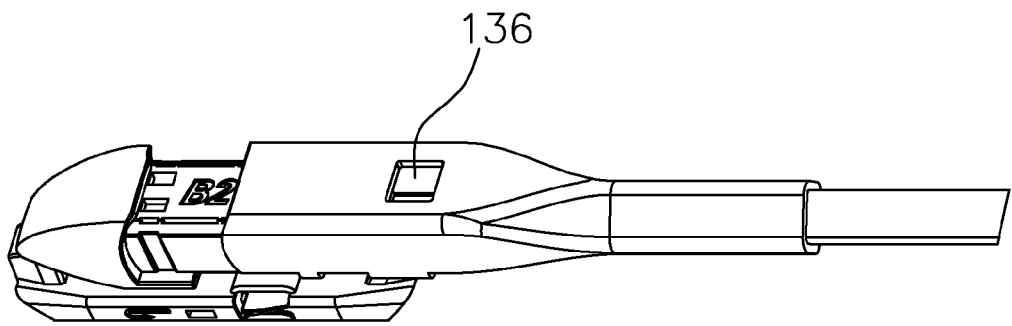
Figure 15:
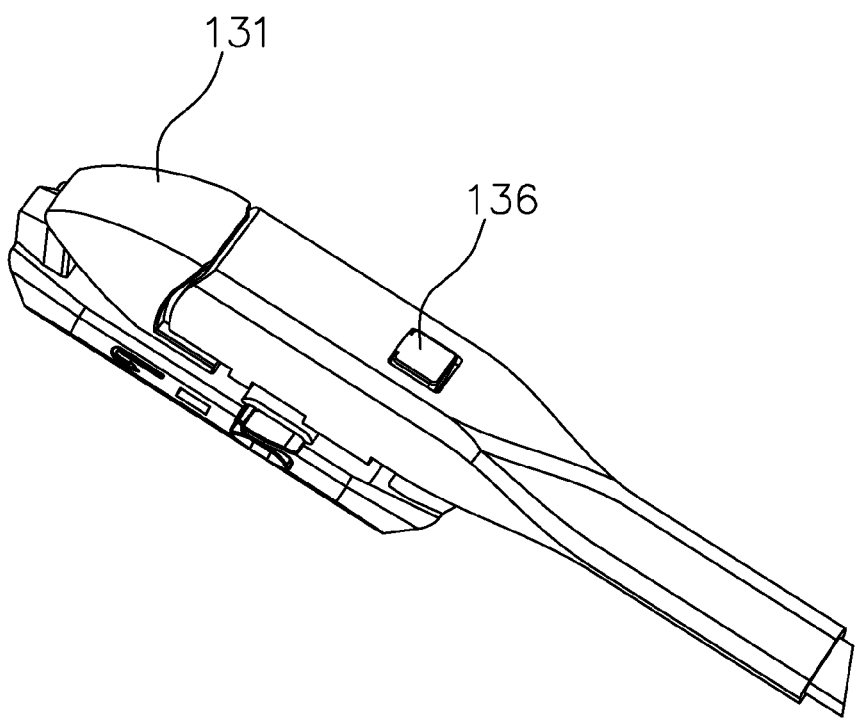

As shown in FIG. 13 to FIG. 15, the third elastic engaging arm 134 and the fourth elastic engaging arm 136 are first turned to the rear portion of the third upper coupling 131 to be parallel to each other, and then the wiper arm is coupled to the third upper coupling 131. By using the first elastic engaging platform 136 to engage with a notch of the wiper arm, the wiper arm is precisely positioned.

As shown in FIG. 16 to FIG. 18, similarly, the third elastic engaging arm 134 and the fourth elastic engaging arm 136 are first turned to the rear portion of the third upper coupling 131 to be parallel to each other, and then the wiper arm is coupled to the third upper coupling 131. The difference between FIGS. 16-18 and FIGS. 13-15 is that the wiper arm has an angled portion.

FIG. 19 shows a fourth embodiment of the windshield wiper connector of the present invention. In this embodiment, the connecting part 1 has a fourth fixing seat 140 and a fourth upper coupling 141. The fourth fixing seat 140 has a fifth pivot 142 thereon. The inner walls of two sides of the fourth upper coupling 141 are formed with a pair of third positioning recesses 143 to mate with the fifth pivot 142. A rear portion of the fourth upper coupling 141 is formed with a receiving hole 144 and a fifth elastic engaging arm 145 under the receiving hole 144. The fifth elastic engaging arm 145 is formed with a raised rib 146. An outer end of the raised rib 146, close to the receiving hole 144, has a second wedge surface 147.

Figure 22:
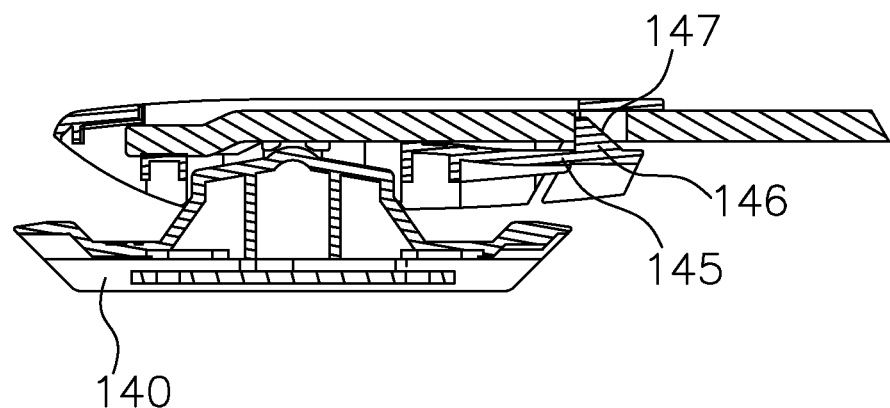

As shown in FIG. 20 to FIG. 22, a Renault wiper arm is inserted into the receiving hole 144 of the rear portion of the fourth upper coupling 141. By the through hole of the Renault wiper arm to engage with the second wedge surface 147 of the raised rib 146 of the fifth elastic engaging arm 145, the Renault wiper arm is fully positioned to the windshield wiper connector, as shown in FIG. 22.

Figure 23:
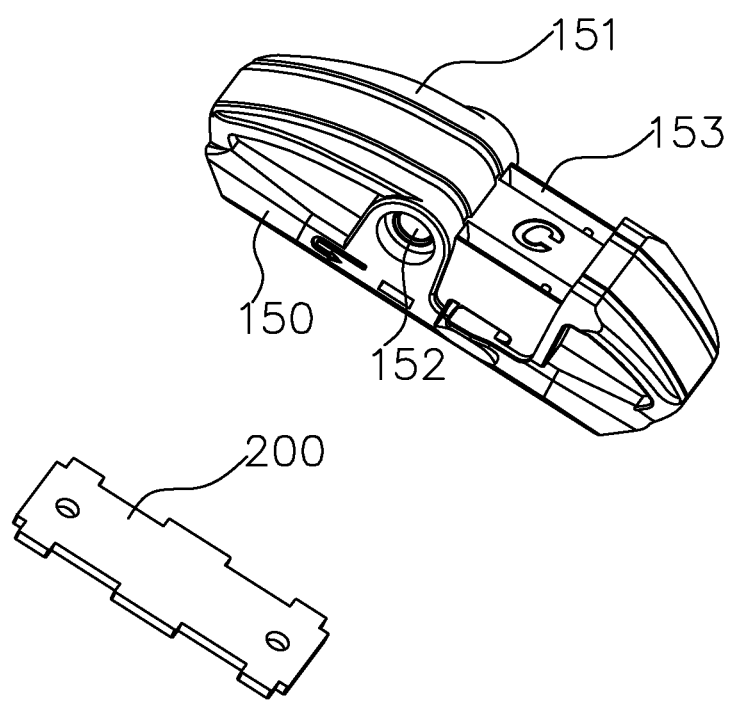
FIG. 23 is a schematic view showing a fifth embodiment of the windshield wiper connector of the present invention.

FIG. 23 shows a fifth embodiment of the windshield wiper connector of the present invention. In this embodiment, the connecting part 1 has a fifth fixing seat 150, a fifth upper coupling 151, and a first pivot hole 152 formed between the fifth fixing seat 150 and the fifth upper coupling 151. The fifth upper coupling 151 is formed with a U-shaped concave portion 153.

Figure 24:
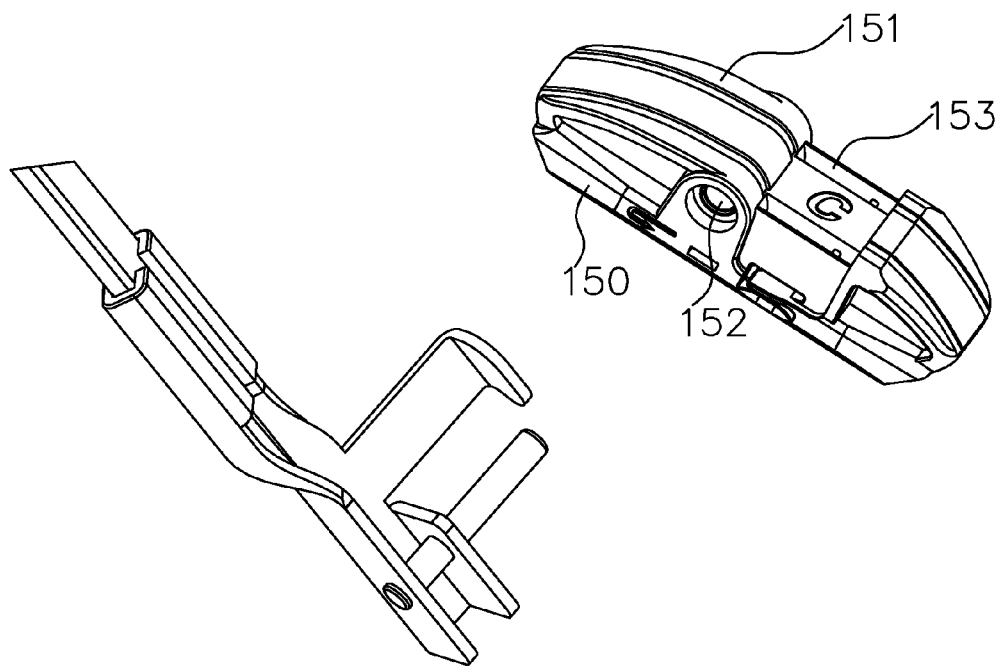
FIG. 24 to FIG. 26 are schematic views showing the fifth embodiment of the present invention connected with a wiper arm.
Figure 25:
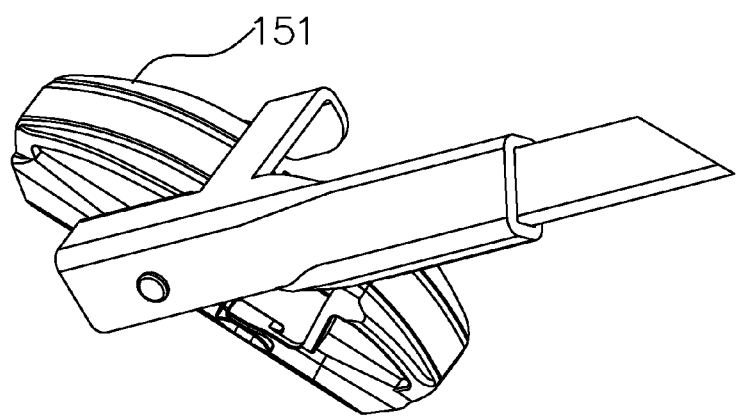
Figure 26:
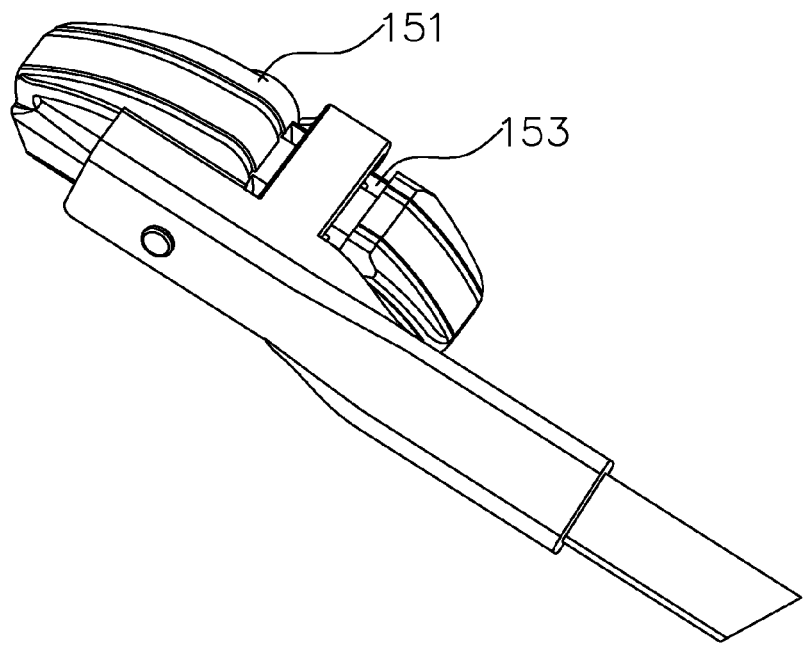

As shown in FIG. 24 to FIG. 26, the pivot of a Focus (Ford) wiper arm is first inserted into the first pivot hole 152, and then the Focus wiper arm is turned with the buckle of the Focus wiper arm to engage with the U-shaped concave portion 153.

Figure 27:
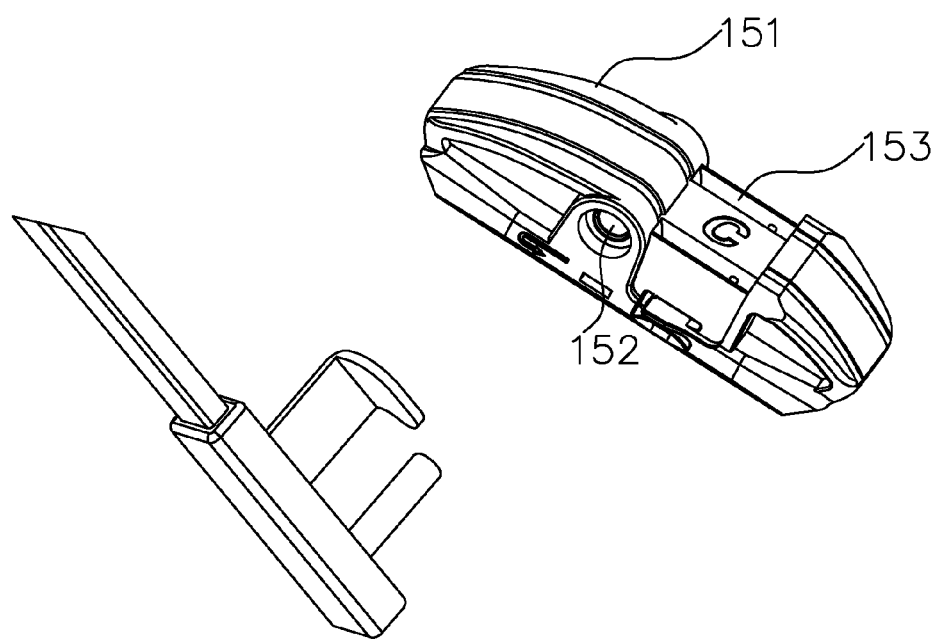
Figure 46:
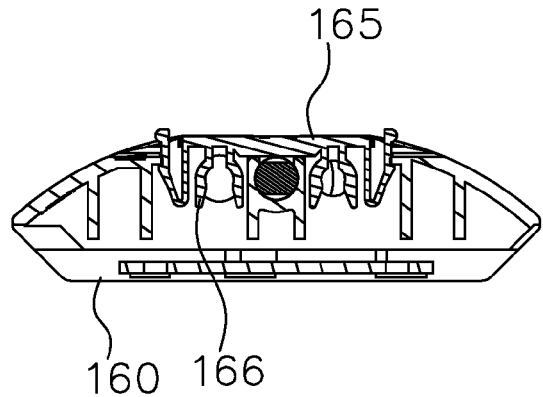

FIG. 27 to FIG. 29 are schematic views showing assembly of the wiper arm for BMW 7 Series. The pivot of the wiper arm is first inserted into the first pivot hole 152, and then the wiper arm is turned with the buckle of the wiper arm to engage with the U-shaped concave portion 153.

FIG. 30 shows a sixth embodiment of the windshield wiper connector of the present invention. In this embodiment, the connecting part 1 has a sixth fixing seat 160 and a sixth upper coupling 161. The sixth fixing seat 160 has a second pivot hole 162, a third pivot hole 163, and a first U-shaped trough 164 formed between the second pivot hole 162 and the third pivot hole 163. The second pivot hole 162 and the third pivot hole 163 each are divided into two spaced sections along the direction of the width of the wiper rod of the windshield wiper. The sixth upper coupling 161 has a lid 165 and elastic claws 166 connected under the lid 165. The elastic claws 166 are located between the two spaced sections of the first pivot hole 162 or the two spaced sections of the second pivot hole 163 for fixing the wiper arm. FIG. 31 to FIG. 35 are schematic views showing assembly of the sixth embodiment and a first wiper arm. The sixth upper coupling 161 is first detached from the sixth fixing seat 160, and then the first wiper arm is inserted into the second pivot hole 163. After that, the sixth upper coupling 161 is covered to position the first wiper arm, as shown in FIG. 34 and FIG. 35.

FIG. 36 to FIG. 40 are schematic views showing assembly of the sixth embodiment and a second wiper arm. The assembly way is substantially similar to the first wiper arm with the difference that the second wiper arm is inserted into the third pivot hole.

FIG. 41 to FIG. 46 are schematic views showing assembly of the sixth embodiment and a third wiper arm. The third wiper arm is inserted into the first U-shaped trough 164 and then positioned by the sixth upper coupling 161.

Figure 47:
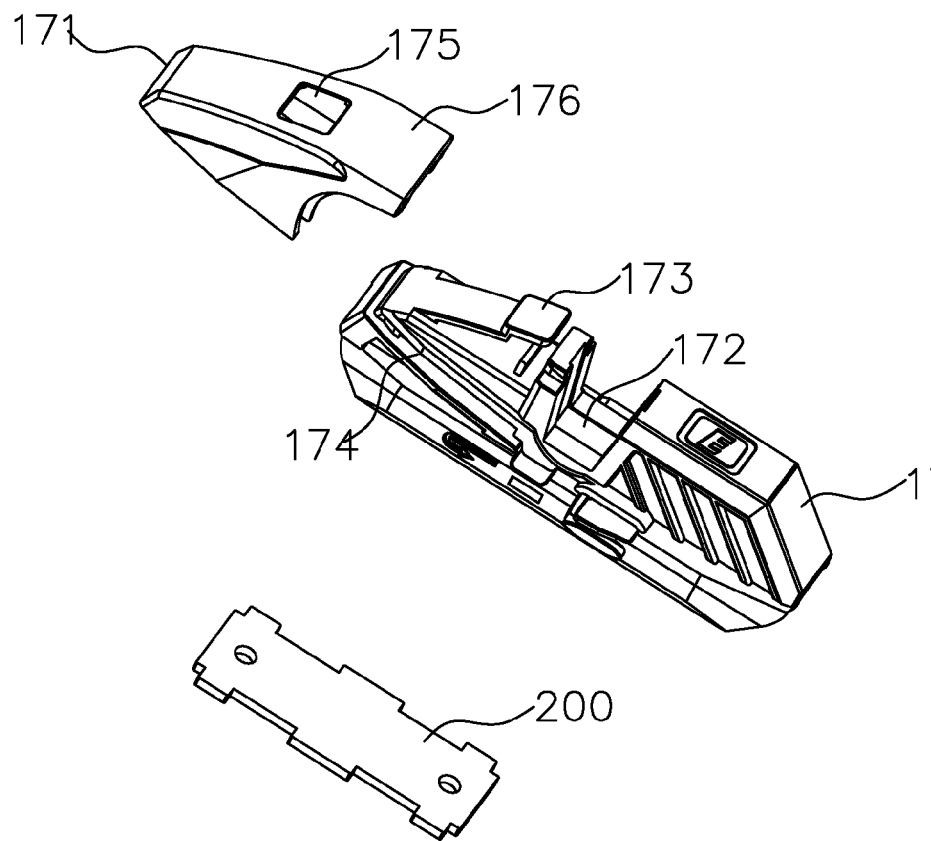
FIG. 47 is a schematic view showing a seventh embodiment of the windshield wiper connector of the present invention.
Figure 48:
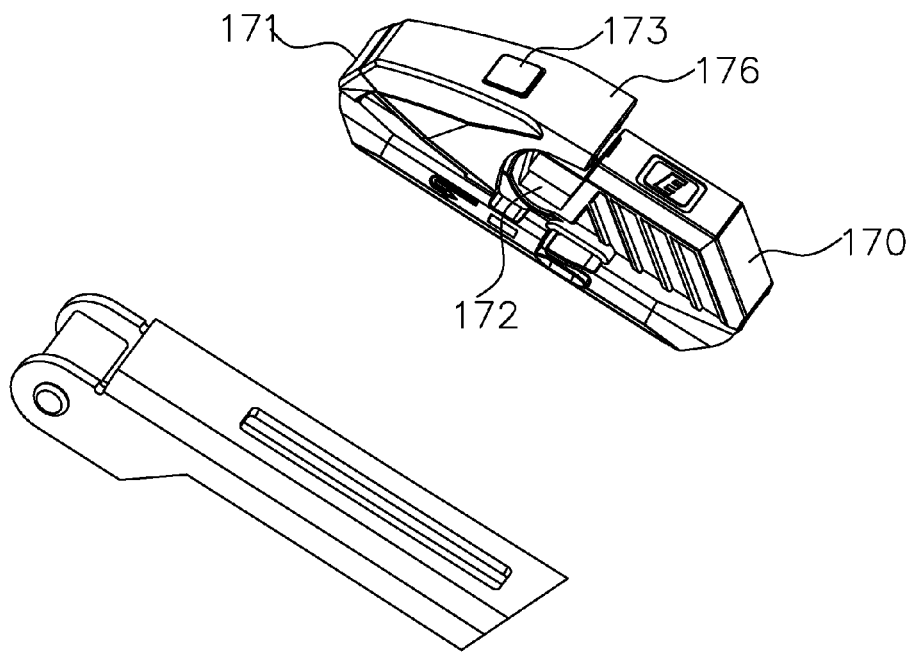
Figure 48:
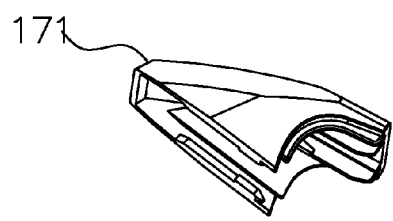
Figure 49:
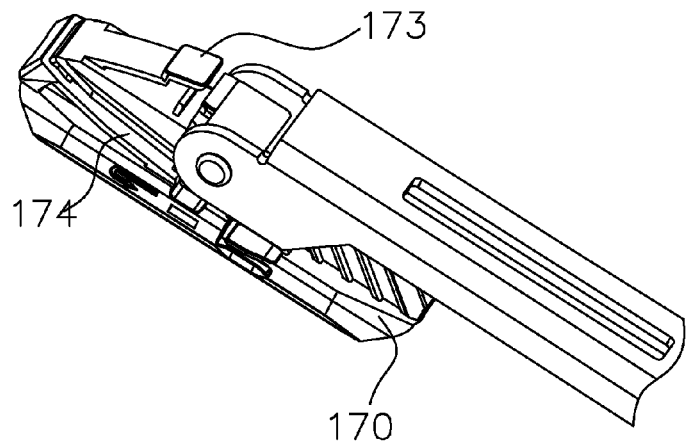

FIG. 47 shows a seventh embodiment of the windshield wiper connector of the present invention. In this embodiment, the connecting part 1 has a seventh fixing seat 170 and a seventh upper coupling 171. The seventh fixing seat 170 is formed with a third opening 172 for a turning pivot of the wiper arm to traverse therethrogh. The seventh fixing seat 170 is further formed with a second elastic engaging platform 173 at a middle portion in front of the third opening 172. The seventh fixing seat 170 is further formed with slide rails 174 at two sides of a front end thereof. The seventh upper coupling 171 is formed with a second positioning hole 175 and a shield 176 located behind the second positioning hole 175. The seventh upper coupling 171 is slid along the slide rails 174 to be positioned by the second positioning hole 175 to engage with the second elastic engaging platform 173. The shield 176 is adapted to cover the third opening 172 when the second positioning hole 175 is engaged with the second elastic engaging platform 173.

As shown in FIG. 48 to FIG. 52, the seventh upper coupling 171 is first opened, and then one end of the wiper arm is pushed down to be accommodated in the third opening 172, such that the wiper arm is rotatably mounted on the seventh fixing seat 170. After that, the seventh upper coupling 171 is coupled to the seventh fixing seat 170, namely, the second positioning hole 175 of the seventh upper coupling 171 is positioned by the second elastic engaging platform 173 of the seventh fixing seat 170 and the shield 176 is to cover the third opening 172 so as to limit the whole wiper arm.

FIG. 53 shows an eighth embodiment of the windshield wiper connector of the present invention. In this embodiment, the connecting part 1 has an eighth fixing seat 180 and an inner coupling 181. The eighth fixing seat 180 has a fourth opening 182 and a six pivot 183. The inner coupling 181 is inserted in the fourth opening 182 through the six pivot 183. The inner coupling 181 is formed with two engaging troughs 184 for insertion of engaging blocks of the wiper arm.

As shown in FIG. 54 to FIG. 57, one end of an Audi A6L wiper arm is inserted into the engaging troughs 184 of the inner coupling 181 and then pushed downward, such that the Audi A6L wiper arm is coupled to the eighth fixing seat 180.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A windshield wiper connector, comprising:
 a connecting plate having a lock hole of a diameter, an upper surface and a lower surface disposed parallel to the diameter of the lock hole,
 a first limit protrusion, and
 a second protrusion,
 the lock hole disposed at an end of the upper surface and the lower surface, penetrating through the upper and lower surfaces of the connecting plate,
 the first limit protrusion and the second limit protrusion being respectively located at two sides of the connecting plate and protruding in a direction of a width of a wiper rod of a windshield wiper;
 a connector main body having
  a connecting part for connecting a wiper arm, the connector main body having
  a first flange and a second flange formed at two sides of a bottom of the connector main body and extending along a direction of the length of the wiper rod of the windshield wiper,
  inner walls of the first flange and the second flange being respectively formed with a first limit slot and a second limit slot,
  the first limit slot and the second limit slot being respectively to receive the first limit protrusion and the second limit protrusion,
  the connector main body being further formed with at least one elastic detent, disposed parallel to a length of the first flange, wherein when the first limit protrusion slides along the first limit slot, the at least one elastic detent is held by the first limit protrusion, after the first limit protrusion fully mates with the first limit slot, the at least one elastic detent is restored to hold against an edge of the first limit protrusion; and
 a lock member passing through the lock hole to fix the connecting plate to the wiper rod.

2. The windshield wiper connector as claimed in claim 1, wherein the connecting plate is formed with three spaced first limit protrusions and three spaced second limit protrusions, and the inner walls of the first flange and the second flange are formed with three first limit slots and three second limit slots, respectively.

3. The windshield wiper connector as claimed in claim 1, wherein the connecting part has a first fixing seat, a first upper cover, and a first upper coupling, the first flange and the second flange being formed at a bottom of the first fixing seat, the first fixing seat having a first opening at a top thereof, a first pivot and a second pivot in the first opening, the first pivot being located at one end of the first fixing seat, the second pivot being located at a central portion of the first fixing seat, the first upper cover being pivotally connected to the first fixing seat through the first pivot, the first upper coupling being coupled to the second pivot, a front portion of the first upper coupling being formed with a first ear and a second ear, inner surfaces of the first ear and the second ear being formed with elastic engaging portions facing each other, a rear portion of the first upper coupling being formed with a first positioning hole.

4. The windshield wiper connector as claimed in claim 1, wherein the connecting part has a second fixing seat and a second upper coupling, the second fixing seat having a third pivot thereon, inner walls of two sides of the second upper coupling being formed with a pair of first positioning recesses to mate with the third pivot, a front portion of the second upper coupling being formed with a second opening for insertion of the wiper arm, a rear portion of the second upper coupling being formed with a first elastic engaging arm and a second elastic engaging arm, the first elastic engaging arm and the second elastic engaging arm each having a first wedge surface.

5. The windshield wiper connector as claimed in claim 1, wherein the connecting part has a third fixing seat and a third upper coupling, the third fixing seat having a fourth pivot thereon, inner walls of two sides of the third upper coupling being formed with a pair of second positioning recesses to mate with the fourth pivot, two sides of a rear portion of the third upper coupling being formed with a third elastic engaging arm and a fourth elastic engaging arm, a middle of the rear portion of the third upper coupling being formed with a first elastic engaging platform.

6. The windshield wiper connector as claimed in claim 1, wherein the connecting part has a fourth fixing seat and a fourth upper coupling, the fourth fixing seat having a fifth pivot thereon, inner walls of two sides of the fourth upper coupling being formed with a pair of third positioning recesses to mate with the fifth pivot, a rear portion of the fourth upper coupling being formed with a receiving hole and a fifth elastic engaging arm under the receiving hole, the fifth elastic engaging arm being formed with a raised rib, an outer end of the raised rib, close to the receiving hole, having a second wedge surface.

7. The windshield wiper connector as claimed in claim 1, wherein the connecting part has a fifth fixing seat, a fifth upper coupling, and a first pivot hole formed between the fifth fixing seat and the fifth upper coupling, the fifth upper coupling being formed with a U-shaped concave portion.

8. The windshield wiper connector as claimed in claim 1, wherein the connecting part has a sixth fixing seat and a sixth upper coupling, the sixth fixing seat having a second pivot hole, a third pivot hole, and a first U-shaped trough formed between the second pivot hole and the third pivot hole, the second pivot hole and the third pivot hole each being divided into two spaced sections along the direction of the width of the wiper rod of the windshield wiper, the sixth upper coupling having a lid and elastic claws connected under the lid, the elastic claws being located between the two spaced sections of the first pivot hole or the two spaced sections of the second pivot hole for fixing the wiper arm.

9. The windshield wiper connector as claimed in claim 1, wherein the connecting part has a seventh fixing seat and a seventh upper coupling, the seventh fixing seat being formed with a third opening for a turning pivot of the wiper arm to traverse therethrogh, the seventh fixing seat being further formed with a second elastic is engaging platform at a middle portion in front of the third opening, the seventh fixing seat being further formed with slide rails at two sides of a front end thereof, the seventh upper coupling being formed with a second positioning hole and a shield located behind the second positioning hole, wherein the seventh upper coupling is slid along the slide rails to be positioned by the second positioning hole to engage with the second elastic engaging platform, and the shield is adapted to cover the third opening when the second positioning hole is engaged with the second elastic engaging platform.

10. The windshield wiper connector as claimed in claim 1, wherein the connecting part has an eighth fixing seat and an inner coupling, the eighth fixing seat having a fourth opening and a six pivot, the inner coupling being inserted in the fourth opening through the six pivot, the inner coupling being formed with two engaging troughs for insertion of engaging blocks of the wiper arm.

\* \* \* \* \*